(12) United States Patent
Jiang et al.

(10) Patent No.: US 12,000,799 B1
(45) Date of Patent: Jun. 4, 2024

(54) DIGITAL, SELF-DIAGNOSIS, SENSING INTELLIGENT LAYER INTEGRATING ACTIVE AND PASSIVE MONITORING AND METHOD

(71) Applicant: SHANDONG UNIVERSITY, Shandong (CN)

(72) Inventors: Mingshun Jiang, Jinan (CN); Juntao Wei, Jinan (CN); Feiyu Teng, Jinan (CN); Shanshan Lv, Jinan (CN); Lingyu Sun, Jinan (CN); Lei Zhang, Jinan (CN); Faye Zhang, Jinan (CN); Qingmei Sui, Jinan (CN); Lei Jia, Shandong (CN)

(73) Assignee: SHANDONG UNIVERSITY, Jinan (CN)

( * ) Notice: Subject to any disclaimer, the term of this patent is extended or adjusted under 35 U.S.C. 154(b) by 0 days.

(21) Appl. No.: 18/400,246

(22) Filed: Dec. 29, 2023

(30) Foreign Application Priority Data

Mar. 28, 2023 (CN) .......................... 202310332011.9

(51) Int. Cl.
*G01N 29/24* (2006.01)

(52) U.S. Cl.
CPC ................ *G01N 29/2437* (2013.01)

(58) Field of Classification Search
CPC ............. G01N 29/00; G01N 29/2437
See application file for complete search history.

(56) References Cited

U.S. PATENT DOCUMENTS

2011/0029287 A1   2/2011   Sohn et al.

FOREIGN PATENT DOCUMENTS

| CN | 101782447 A | * | 7/2010 | |
|---|---|---|---|---|
| CN | 106226599 A | | 12/2016 | |
| CN | 106769733 A | * | 5/2017 | ............. G01N 15/06 |
| CN | 108146615 A | | 6/2018 | |
| CN | 207488395 U | | 6/2018 | |

(Continued)

OTHER PUBLICATIONS

Sep. 9, 2023 Office Action issued in Chinese Patent Application No. 202310332011.9.

*Primary Examiner* — Tarun Sinha
*Assistant Examiner* — Drexel Alejandro Venero
(74) *Attorney, Agent, or Firm* — Oliff PLC

(57) ABSTRACT

A digital, self-diagnosis, sensing intelligent layer integrating active and passive monitoring, including: a capacitance testing unit, configured to charge a to-be-tested piezoelectric transducer by generating a step signal, and determine a transition moment, to obtain a free capacitance value of the to-be-tested piezoelectric transducer; a frequency testing unit, to charge the to-be-tested piezoelectric transducer by generating sinusoidal signals of different frequencies, and detect a resonant frequency according to the transition moment; an active and passive monitoring module, to obtain analog response signals in an active mode and a passive mode, and convert the analog response signals into digital response signals for transmission; and a main control module, to transmit a self-diagnosis result and the digital response signals to a guided wave host. The intelligent layer integrates active damage scanning and passive impact monitoring while implementing self-diagnosis for a piezoelectric transducer state.

9 Claims, 14 Drawing Sheets

(56) References Cited

FOREIGN PATENT DOCUMENTS

| | | | | |
|---|---|---|---|---|
| CN | 113236632 A | * | 8/2021 | |
| CN | 113236632 A | | 8/2021 | |
| CN | 113933391 A | | 1/2022 | |
| CN | 114384328 A | | 4/2022 | |
| CN | 115103510 A | | 9/2022 | |
| CN | 115825563 A | | 3/2023 | |
| GB | 2388916 A | * | 11/2003 | ........... G08B 29/126 |

* cited by examiner

DIGITAL, SELF-DIAGNOSIS, SENSING INTELLIGENT LAYER INTEGRATING ACTIVE AND PASSIVE MONITORING AND METHOD

TECHNICAL FIELD

The present invention relates to the field of structural health monitoring technologies, and in particular, to a digital, self-diagnosis, sensing intelligent layer integrating active and passive monitoring and a method.

BACKGROUND

The description in this section merely provides background information related to the present invention and does not necessarily constitute the prior art.

A sensing intelligent layer is a piezoelectric intelligent layer formed from a flexible material integrating a piezoelectric ceramic sensor and by etching, on copper foil, a circuit required for designing, assembling a plurality of piezoelectric elements by using the surface packaging technology, and leading pins of the piezoelectric elements out through a unified interface. Compared with a plurality of monolithic sensors, the sensing intelligent layer reduces a quantity of cables, improves efficiency and accuracy of sensor layout, and may be designed in a customized manner for different structures to meet monitoring requirements of the structures in different shapes.

As shown in FIG. 1, a conventional piezoelectric sensing intelligent layer connects leads of piezoelectric transducers to an interface without performing any processing on a signal. The intelligent layer only functions as a wire, and then the interface of the intelligent layer is connected to an ultrasonic guided wave host by a multi-core cable. The host emits a high-frequency excitation of about 300 kHz and applies the signal to an exciting piezoelectric transducer. The exciting piezoelectric transducer excites an ultrasonic guided wave in a structure. A receiving piezoelectric transducer converts the ultrasonic guided wave into a weak-voltage analog signal and transfers the analog signal to the guided wave host through the multi-core cable. The guided wave host performs processing, such as amplification and filtering, on the signal to determine whether the structure has been damaged.

The conventional, analog, piezoelectric sensing intelligent layer has the following disadvantages:

(1) An ultrasonic response signal output by the intelligent layer is an analog signal with a weak amplitude and is extremely susceptible to noise interference from the external environment when being transmitted to a guided wave host. In addition, during the transmission, the presence of cable resistance causes the amplitude of the signal to attenuate, making it more difficult to locate the damage.

(2) Whether every piezoelectric transducer on the intelligent layer is normal cannot be learned of either before or after the intelligent layer is pasted. To confirm whether piezoelectric transducers are normal before and after the intelligent layer is pasted, a dedicated impedance tester can only be used, or the intelligent layer is connected to the guided wave host, to test signal waveforms. However, there are difficulties, such as power supply difficulty and inconvenient operation, in using an impedance tester on site. If the guided wave host is used for testing, the guided wave host is required to determine a pasting effect according to an amplitude of an ultrasonic response signal. However, in a case that the cable is too long, that the ambient noise is large, or the like, the ultrasonic response signal may attenuate greatly and is very likely to be drowned in the noise. Therefore, a result of determining performed according to a parameter, such as an amplitude of a signal, may not be accurate.

(3) When propagating in the cable between the intelligent layer and the host, an excitation generated by the host may generate high-amplitude crosstalk signals between multi-core cables of responding piezoelectric transducers through coupling between the multi-core cables, and the longer the cable, the higher the amplitude of the crosstalk signal. FIG. 2 shows ultrasonic response signals obtained at different cable lengths by using an excitation of 300 kHz. Because the amplitude of the crosstalk signal is higher than an amplitude of an effective signal, to prevent output of a subsequent operational amplifier from being saturated, the response signal cannot be amplified by a larger factor, which affects a damage identification effect.

(4) A difference between a time of emitting an excitation and a time of obtaining an ultrasonic response signal is defined as a flight time, which is an important parameter for determining whether the structure is damaged. Because a generation time of a signal of the conventional intelligent layer can be determined only after the signal is transmitted to the host through the cable, it is impossible to learn of an accurate flight time of the excitation, and the accurate flight time can only be replaced according to a time of obtaining the signal by the host. An error of the flight time may be generated due to the transmission on the cable and the signal processing on the host.

(5) To identify damage on the structure, a quantity of piezoelectric transducers on each intelligent layer is not determined, and therefore, a quantity of cores of the cable is not fixed. For intelligent layers with different quantities of piezoelectric transducers, the cable needs to be customized. When a quantity of piezoelectric transducers is large, the diameter of the cable is large, the weight of the cable is large, and the system costs are high.

In addition, there is an existing sensing intelligent layer (Application No.: CN201711287418.5). Although an analog signal can be converted into a digital signal in the intelligent layer, this intelligent layer can only implement passive monitoring of impact damage, neither can implement active scanning and identification of damage, nor can switch between active scanning and passive monitoring, and does not have a self-diagnosis function for a piezoelectric transducer state either.

SUMMARY

To resolve the foregoing problem, the present invention provides a digital, self-diagnosis, sensing intelligent layer integrating active and passive monitoring and a method. The sensing intelligent layer integrates active damage scanning and passive impact damage monitoring, in the intelligent layer, an analog response signal from a piezoelectric transducer is converted into a digital signal and transmitted to a guided wave host, and in addition, self-diagnosis for a piezoelectric transducer state is also implemented.

To achieve the foregoing objective, the present invention uses the following technical solutions.

According to a first aspect, the present invention provides a digital, self-diagnosis, sensing intelligent layer integrating active and passive monitoring, including: a piezoelectric transducer self-diagnosis module, an active and passive monitoring module, and a main control module.

The piezoelectric transducer self-diagnosis module includes:
  a capacitance testing unit, configured to charge a to-be-tested piezoelectric transducer by generating a step signal of a given amplitude, determine a transition moment by comparing a voltage at two terminals of the to-be-tested piezoelectric transducer with a first reference voltage, to determine a capacitor charging time, and then, obtain a free capacitance value of the to-be-tested piezoelectric transducer, to determine whether the free capacitance value is normal; and
  a frequency testing unit, configured to charge the to-be-tested piezoelectric transducer by generating sinusoidal signals of different frequencies and a fixed amplitude, determine a changing voltage according to a current of the to-be-tested piezoelectric transducer, compare the changing voltage with a second reference voltage, and detect a resonant frequency according to a frequency of a sinusoidal signal corresponding to a transition moment for high and low levels in a comparison result;

The active and passive monitoring module is configured to switch a working state of the intelligent layer between active damage scanning, obtain analog response signals from the piezoelectric transducer in an active mode and a passive mode, and convert the analog response signals into digital response signals for transmission.

The main control module is configured to transmit a piezoelectric transducer self-diagnosis result and the digital response signals to an external guided wave host.

In an optional implementation, the digital, self-diagnosis, sensing intelligent layer further includes N piezoelectric transducers, and a 1-out-of-N excitation selector, a 1-out-of-N acquisition selector, and N switches that are connected to the piezoelectric transducers, to switch to a corresponding channel in different modes.

In a piezoelectric transducer self-diagnosis mode, the 1-out-of-N excitation selector and the N switches are all opened, and the 1-out-of-N acquisition selector closes a corresponding switch channel according to a serial number of the to-be-tested piezoelectric transducer, to perform a capacitance test and a frequency test on the to-be-tested piezoelectric transducer.

In the active mode, the N switches are all opened, a corresponding switch channel in the 1-out-of-N excitation selector is closed according to a serial number of an exciting piezoelectric transducer emitting an excitation, and a corresponding switch channel in the 1-out-of-N acquisition selector is closed according to a serial number of a receiving piezoelectric transducer receiving a response, to obtain the analog response signal of the piezoelectric transducer in the active mode and convert the analog response signal into the digital response signal.

In the passive mode, the 1-out-of-N excitation selector and the 1-out-of-N acquisition selector are both opened, and the N switches are all closed, to obtain the analog response signal of the piezoelectric transducer in the passive mode and convert the analog response signal into the digital response signal.

In an optional implementation, the digital, self-diagnosis, sensing intelligent layer further includes a USB interface connected to a computer and a host interface connected to the external guided wave host.

In an optional implementation, the digital, self-diagnosis, sensing intelligent layer has a power switching function and is configured to switch, when being powered by both the computer and the external guided wave host, to being powered by the external guided wave host.

In an optional implementation, the capacitance testing unit includes a step signal generator, a first resistor, and a first comparator. After being connected in series to the first resistor, the step signal generator is connected to the two terminals of the piezoelectric transducer, and the first reference voltage and the voltage at the two terminals of the piezoelectric transducer serve as inputs of the first comparator.

The free capacitance value of the to-be-tested piezoelectric transducer is:

$$v = U \times \left[1 - e^{\frac{-t}{R2*(C0+C1)}}\right]$$

where v is the voltage at the two terminals of the to-be-tested piezoelectric transducer, U is the amplitude of the step signal, t is a time of applying the step signal, R2 is a known first resistance value, C0 is a static capacitance value of the piezoelectric transducer, C1 is a dynamic capacitance value of the piezoelectric transducer, and C0+C1 is the free capacitance value.

In an optional implementation, the frequency testing unit includes a sinusoidal signal generator, a second resistor, an operational amplifier, and a second comparator. After being connected in series to the second resistor, the sinusoidal signal generator is connected to the two terminals of the piezoelectric transducer, the operational amplifier is connected in parallel to two terminals of the second resistor, an output of the operational amplifier and the second reference voltage are inputs of the second comparator, a change of a current at the two terminals of the second resistor is tested through the operational amplifier, and the changing voltage is output.

In an optional implementation, the piezoelectric transducer self-diagnosis module further includes a pasting effect detection unit, configured to excite, by any piezoelectric transducer, an ultrasonic signal, acquire an analog response signal from another receiving piezoelectric transducer, convert the analog response signal into a digital response signal, and compare amplitudes of digital response signals from receiving piezoelectric transducers at different distances, to determine whether there is an abnormal piezoelectric transducer, where if both a free capacitance value and a resonant frequency of the abnormal piezoelectric transducer fall within specified ranges, a pasting effect of the piezoelectric transducer is incorrect.

In an optional implementation, in the active and passive monitoring module:
  in the active mode, the exciting piezoelectric transducer emits an excitation obtains the analog response signal from the receiving piezoelectric transducer, and after converting the analog response signal convert into a digital response signal, transmits the digital response signal, to perform active damage scanning; and
  in the passive mode, an analog response signal received by the piezoelectric transducer after triggering of an impact event is obtained, and the analog response signal is converted into a digital response signal for transmission, to perform passive impact monitoring.

In an optional implementation, the active and passive monitoring module further includes an excitation arrival time detection unit, configured to determine an excitation arrival moment in the active mode. Specifically, a voltage of the emitted excitation is divided, the divided voltage is compared with a third reference voltage by using a comparator, and the excitation arrival moment is determined according to times of high and low levels obtained after the comparison and a frequency of the excitation.

According to a second aspect, the present invention a working method of a digital, self-diagnosis, sensing intelligent layer integrating active and passive monitoring, including:

connecting N piezoelectric transducers to a 1-out-of-N excitation selector, a 1-out-of-N acquisition selector, and N switches, to switch to a corresponding channel in different modes;

in a piezoelectric transducer self-diagnosis mode, opening all the 1-out-of-N excitation selector and the N switches, and closing, by the 1-out-of-N acquisition selector, a corresponding switch channel according to a serial number of a to-be-tested piezoelectric transducer, to perform a capacitance test, a frequency test, and pasting effect detection on the to-be-tested piezoelectric transducer, where the capacitance test includes: charging the to-be-tested piezoelectric transducer by generating a step signal of a given amplitude, determining a transition moment by comparing a voltage at two terminals of the to-be-tested piezoelectric transducer with a first reference voltage, to determine a capacitor charging time, and then, obtaining a free capacitance value of the to-be-tested piezoelectric transducer, to determine whether the free capacitance value is normal; and the frequency test includes: charging the to-be-tested piezoelectric transducer by generating sinusoidal signals of different frequencies and a fixed amplitude, determining a changing voltage according to a current of the to-be-tested piezoelectric transducer, comparing the changing voltage with a second reference voltage, and detecting a resonant frequency according to a frequency of a sinusoidal signal corresponding to a transition moment for high and low levels in a comparison result; and the pasting effect detection includes exciting, by any piezoelectric transducer, an ultrasonic signal, acquiring an analog response signal from another receiving piezoelectric transducer, converting the analog response signal into a digital response signal, and comparing amplitudes of digital response signals from receiving piezoelectric transducers at different distances, to determine whether there is an abnormal piezoelectric transducer, where if both a free capacitance value and a resonant frequency of the abnormal piezoelectric transducer fall within specified ranges, a pasting effect of the piezoelectric transducer is incorrect;

in the active mode, opening all the N switches, closing corresponding switch channels in the 1-out-of-N excitation selector and the 1-out-of-N acquisition selector according to a serial number of a piezoelectric transducer emitting an excitation and receiving a response, to obtain an analog response signal from a corresponding piezoelectric transducer and convert the analog response signal into a digital response signal for transmission; and in the passive mode, opening both the 1-out-of-N excitation selector and the 1-out-of-N acquisition selector, and closing all the N switches, to obtain an analog response signal received by the piezoelectric transducer after triggering of an impact event, and convert the analog response signal into a digital response signal for transmission.

Compared with the prior art, the present invention has the following beneficial effects.

The present invention provides a digital, self-diagnosis, sensing intelligent layer integrating active and passive monitoring and a method. The sensing intelligent layer converts a response signal from the piezoelectric transducer into a digital signal and is connected to the guided wave host, to increase an anti-interference capability of the signal, prevent the signal from being attenuated during transmission, and avoid a strong crosstalk signal caused by a long cable. In addition, the piezoelectric sensing intelligent layer integrates active damage scanning and passive impact monitoring while implementing self-diagnosis for a piezoelectric transducer state.

To resolve the problem that an ultrasonic response signal includes large-amplitude crosstalk and is susceptible to ambient interference and large amplitude attenuation, in the present invention, a digital response signal is transmitted, which, compared with the conventional analog signal, effectively improves the anti-interference capability of the signal and avoids signal amplitude attenuation. In this way, even if a crosstalk signal is superimposed on the signal, an amplitude of the signal is not affected, so that the self-diagnosis for a piezoelectric transducer state and identification of damage on the structure can be more accurately performed.

To resolve the problem that quality of a piezoelectric transducer before and after pasting cannot be determined, the intelligent layer improved in the present invention integrates functions such as free capacitance testing and resonant frequency testing on a piezoelectric transducer. In addition, the intelligent layer can be directly connected to a computer through a USB interface, to implement self-diagnosis on performance of all piezoelectric transducers on the intelligent layer before and after pasting, and to find and resolve, in time, a problem that occurs before or after pasting.

To resolve the problem that a flight time obtained by the conventional guided wave system is inaccurate, in the present invention, an excitation arrival time detection unit is designed, to calculate an arrival time of an excitation according to a level change moment output by the comparator, thereby avoiding using a sampling chip with a high sampling rate and reducing system costs and power consumption while obtaining a flight time of an excitation more accurately, which helps to improve the damage identification effect.

To resolve the problem that a quantity of cores of the conventional intelligent layer is not fixed, in the present invention, a unified interface is used on the improved intelligent layer, and a quantity of cores of the cable is fixed, which saves cable costs, reduces cable types, and facilitates unified management of materials.

The additional aspects and advantages of the present invention will be provided in the following description, some of which will become apparent from the following description or may be learned from practices of the present invention.

BRIEF DESCRIPTION OF THE DRAWINGS

Accompanying drawings that constitute a part of the present invention are used for providing further understanding about the present invention. Exemplary embodiments of the present invention and descriptions thereof are used for explaining the present invention, and do not constitute an inappropriate limitation on the present invention.

DETAILED DESCRIPTION

Figure 1:
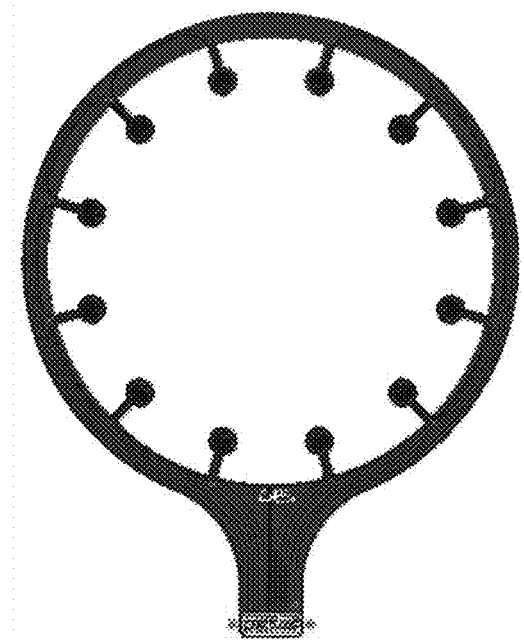
FIG. 1 is a schematic diagram of a conventional, analog, piezoelectric, sensing intelligent layer.
Figure 2:
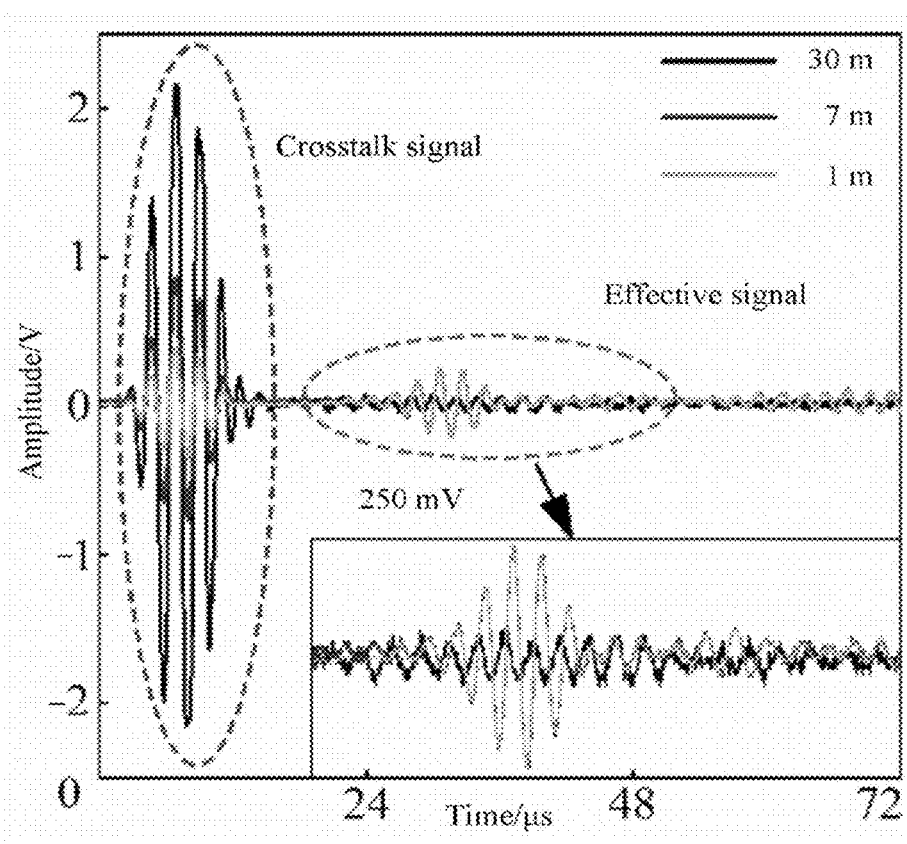
FIG. 2 is a diagram of comparison between crosstalk and an effective signal of a conventional, analog, piezoelectric, sensing intelligent layer.

The present invention is further described below with reference to the accompanying drawings and embodiments.

The following detailed descriptions are all exemplary and are intended to provide a further understanding of the present invention. Unless otherwise defined, all technical and scientific terms used herein have the same meanings as commonly understood by a person of ordinary skill in the field to which the present invention belongs.

It should be noted that terms used herein are only for the purpose of describing specific implementations and are not intended to limit the exemplary implementations of the present invention. As used herein, the singular form is intended to include the plural form, unless the context clearly indicates otherwise. In addition, it should further be understood that terms "include", "have", and any variants thereof mean to cover the non-exclusive inclusion, for example, a process, method, system, product, or device that includes a list of steps or units is not necessarily limited to those units, but may include other units not expressly listed or inherent to such a process, method, system, product, or device.

The embodiments in the present invention and features in the embodiments may be mutually combined in a case that no conflict occurs.

Embodiment 1

This embodiment provides a digital, self-diagnosis, sensing intelligent layer integrating active and passive monitoring, including: a piezoelectric transducer self-diagnosis module, an active and passive monitoring module, and a main control module.

The piezoelectric transducer self-diagnosis module includes:
  a capacitance testing unit, configured to charge a to-be-tested piezoelectric transducer by generating a step signal of a given amplitude, determine a transition moment by comparing a voltage at two terminals of the to-be-tested piezoelectric transducer with a first reference voltage, to determine a capacitor charging time, and then, obtain a free capacitance value of the to-be-tested piezoelectric transducer, to determine whether the free capacitance value is normal; and
  a frequency testing unit, configured to charge the to-be-tested piezoelectric transducer by generating sinusoidal signals of different frequencies and a fixed amplitude, determine a changing voltage according to a current of the to-be-tested piezoelectric transducer, compare the changing voltage with a second reference voltage, and detect a resonant frequency according to a frequency of a sinusoidal signal corresponding to a transition moment for high and low levels in a comparison result;

The active and passive monitoring module is configured to switch a working state of the intelligent layer between active damage scanning, obtain analog response signals from the piezoelectric transducer in an active mode and a passive mode, and convert the analog response signals into digital response signals for transmission.

The main control module is configured to transmit a piezoelectric transducer self-diagnosis result and the digital response signals to an external guided wave host.

In this embodiment, the active mode is active damage scanning, and the passive mode is passive impact monitoring. According to use requirements, the sensing intelligent layer may select any of the three working modes: piezoelectric transducer self-diagnosis, active damage scanning, and passive impact monitoring.

Figure 3:
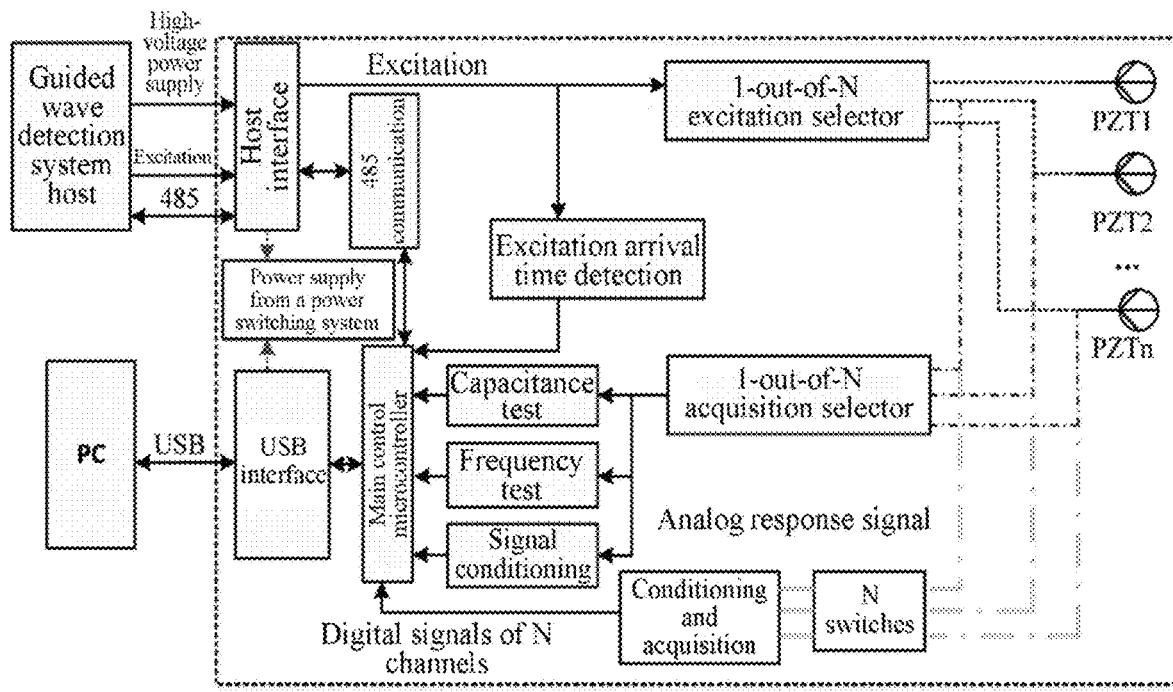
FIG. 3 is a block diagram of a digital, self-diagnosis, sensing intelligent layer integrating active and passive monitoring according to Embodiment 1 of the present invention.
Figure 4:
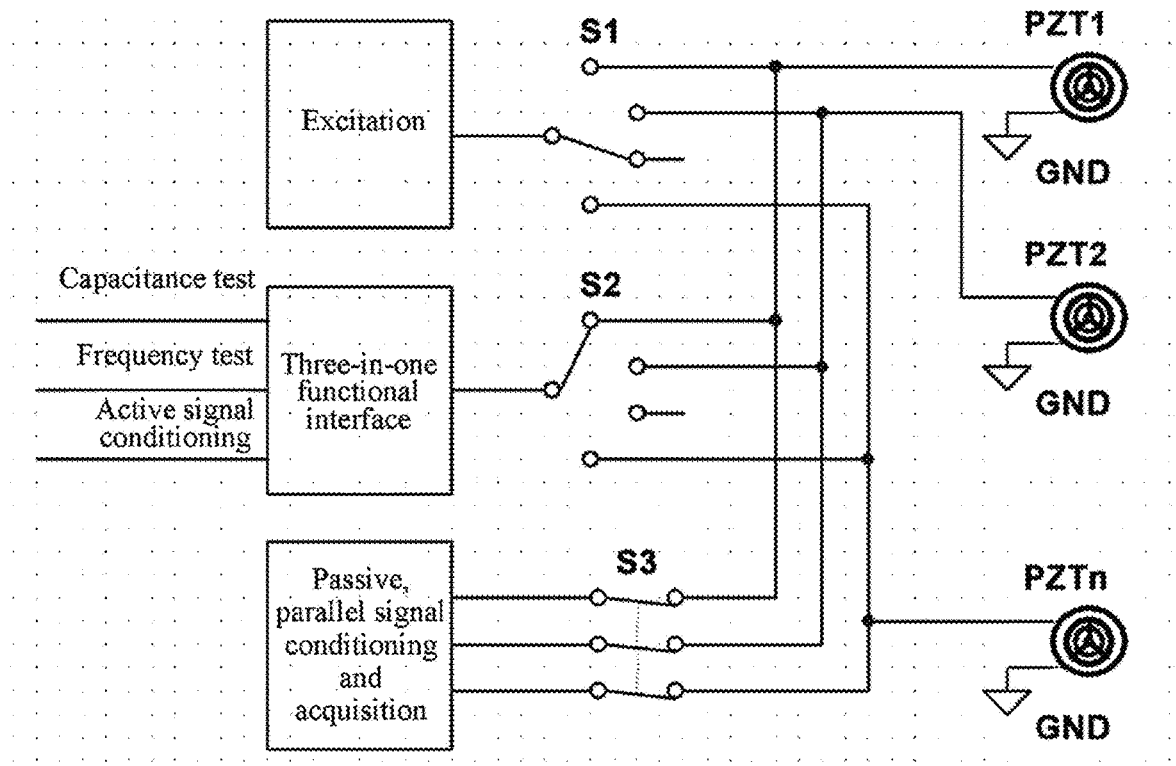
FIG. 4 is a schematic diagram of setting a working mode of a digital, self-diagnosis, sensing intelligent layer according to Embodiment 1 of the present invention.

As shown in FIG. 3 and FIG. 4, the sensing intelligent layer includes N piezoelectric transducers (PZT). The piezoelectric transducers access an excitation through a 1-out-of-N excitation selector S1. A specific piezoelectric transducer may be selected through S1 to receive an excitation emitted from the guided wave host, so that the piezoelectric transducer can excite an ultrasonic guided wave in a structure. The piezoelectric transducer is connected to a three-in-one functional interface by a 1-out-of-N acquisition selector S2, where the three-in-one functional interface is configured to access a capacitance test, a frequency test, and an active signal conditioning mode; accesses a passive impact monitoring mode through N switches S3; and switches, through cooperation of the 1-out-of-N excitation selector, the 1-out-of-N acquisition selector, and the N switches, to different channels in different working modes, to enable the intelligent layer to implement both active damage scanning and passive impact monitoring functions, and implement self-diagnosis for a piezoelectric transducer state.

Specifically:

During working in a piezoelectric transducer self-diagnosis mode, all switch channels of S1 and S3 are opened, and a switch in S2 closes a corresponding switch channel according to a serial number of a to-be-tested piezoelectric transducer. That is, the to-be-tested piezoelectric transducer is connected to the three-in-one functional interface. A state of the piezoelectric transducer is detected through a capacitance test and a frequency test. In addition, a main control microcontroller transmits a piezoelectric transducer self-diagnosis result through 485 communication to the guided wave host.

During working in an active damage scanning mode, all switch channels of S3 are opened, a corresponding switch channel in S1 is closed according to a serial number of an exciting piezoelectric transducer accessing the excitation, and a corresponding switch channel in S2 is closed according to a serial number of a receiving piezoelectric transducer receiving a response. For example, when PZT1 excites an ultrasonic signal, and PZT2 receives an ultrasonic response signal, a first channel in S1 is closed, and a second channel in S2 is closed.

In addition, an ultrasonic response signal from the receiving piezoelectric transducer accesses an active signal conditioning circuit through the three-in-one functional interface, for performing amplifying, filtering, and analog-to-digital conversion operations on an analog ultrasonic response signal, and finally, the main control microcontroller transmits a digital response signal to the guided wave host through 485 communication.

During working in a passive impact monitoring mode, all switch channels of S1 and S2 are opened, and all switch channels of S3 are closed. When an impact event occurs on the structure, all analog ultrasonic response signals received by all the piezoelectric transducers received after triggering of the impact event are acquired, and after amplifying, filtering, and analog-to-digital conversion operations are performed on the analog ultrasonic response signals, digital response signals are transmitted by the main control microcontroller to the guided wave host through 485 communication.

As shown in FIG. 3, the sensing intelligent layer of this embodiment has two external interfaces, which are a USB interface connected to a computer and a host interface connected to the guided wave host. The USB interface is a standard interface that can provide a 5 V/500 mA power supply to the sensing intelligent layer while implementing communication between the sensing intelligent layer and the computer; The host interface is a multi-core cable (in this embodiment, a 5-core cable is used as an example) includes a high-voltage power supply, 485 differential communication, excitations and ground signals, and the like. However, the conventional intelligent layer has only an interface to the guided wave host, and a quantity of cores of the cable depends on a quantity of piezoelectric transducers in the intelligent layer.

Figure 5:
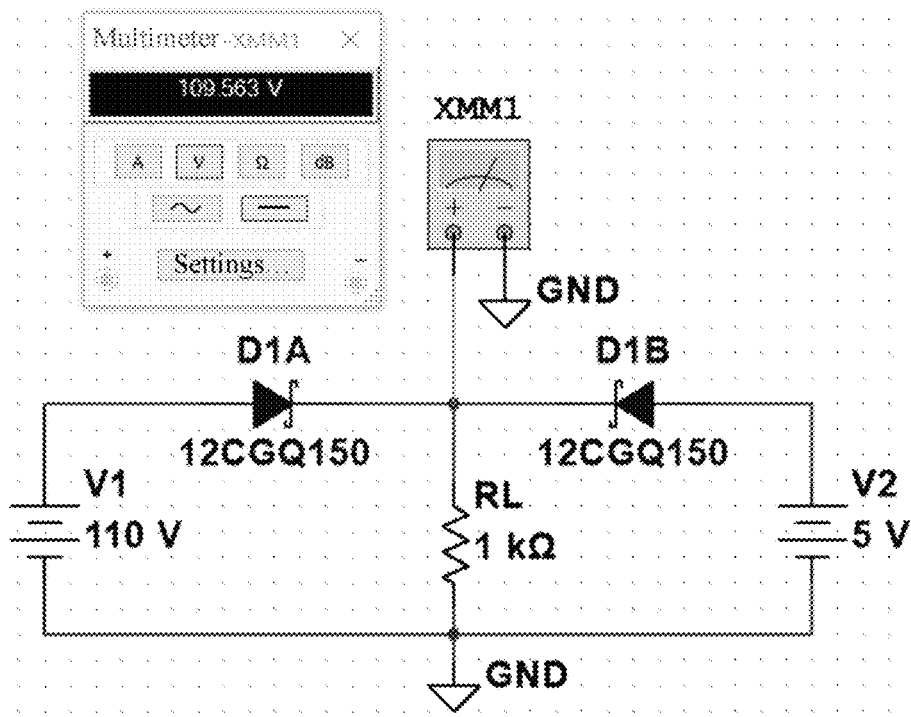
FIG. 5 is a diagram of a principle of automatic power switching according to Embodiment 1 of the present invention.

In this embodiment, a power supply self-switching circuit that is compatible with and that can detect both power supply from the guided wave host and power supply from the USB interface of the computer, and that implements automatic power switching is designed. The intelligent layer is supplied with high-voltage direct-current power by the guided wave host or supplied with 5 V power by the computer, and uses the power switching function to be powered by the high-voltage direct current when being powered by both the power supplies, to reduce the current in the cable and reduce system energy loss. FIG. 5 shows a diagram of a principle of common automatic power switching. When a load RL is powered by both an external direct current at 110 V and a direct current at 5 V, the system power supply is provided at 110 V.

Figure 6:
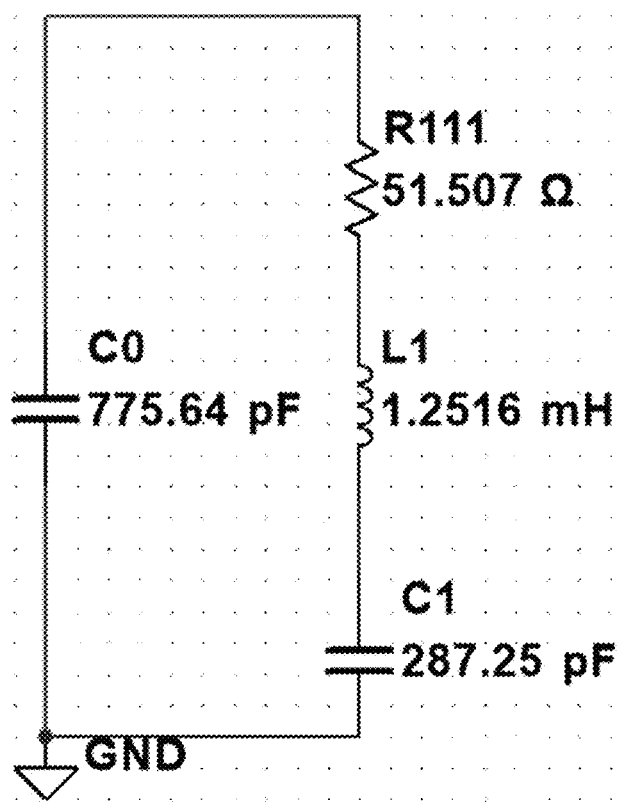
FIG. 6 is a schematic diagram of an equivalent circuit of a piezoelectric transducer according to Embodiment 1 of the present invention.

In this embodiment, the piezoelectric transducer self-diagnosis module includes the capacitance testing unit and the frequency testing unit. The capacitance test and the frequency test may be implemented directly through power supply from the USB interface. In this embodiment, performance parameters of a piezoelectric transducer are tested to determine an equivalent circuit of the piezoelectric transducer. As shown in FIG. 6, C0 is a static capacitance value of the piezoelectric transducer, C1 is a dynamic capacitance value, R1 is dynamic resistance, and L1 is dynamic inductance, a free capacitance value is obtained by summing C0 and C1, that is, a multimeter tests a capacitance value of the test piezoelectric transducer, a resonant frequency of the piezoelectric transducer is 265.48 kHz, and an anti-resonant frequency is 305.938 kHz.

Figure 7:
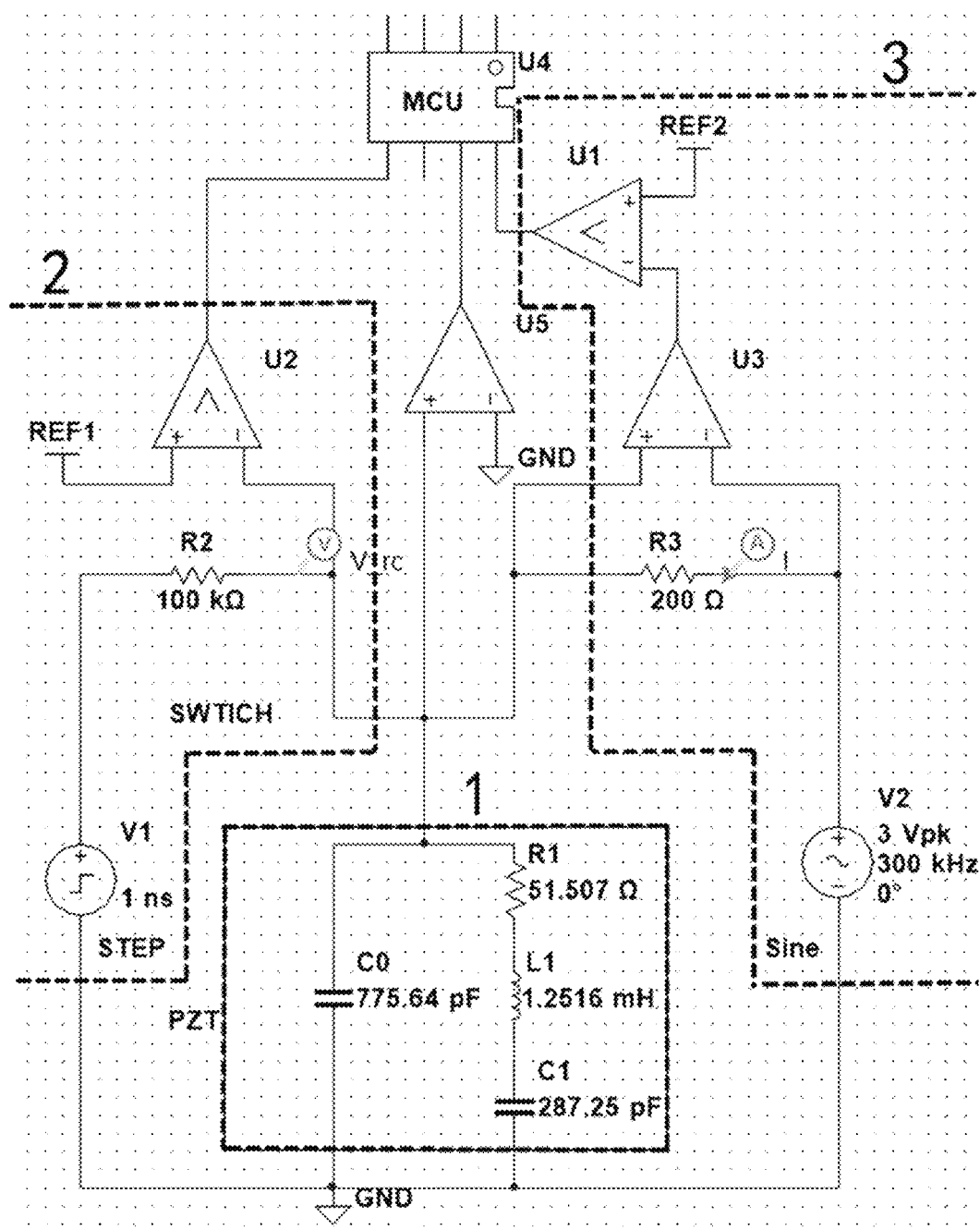
FIG. 7 is a schematic diagram of a circuit of a three-in-one functional interface according to Embodiment 1 of the present invention.

To switch the piezoelectric transducer between different working states of and reduce a quantity of elements of the circuit as many as possible, in this embodiment, a three-in-one functional interface is designed, as shown in FIG. 7, to implement all of a free capacitance value detection function, a resonant frequency detection function, and an analog signal conditioning function on the piezoelectric transducer. A region 1 is the equivalent circuit of the piezoelectric transducer, a region 2 is the capacitance testing unit, and a region 3 is the frequency testing unit. By designing relevant circuits, the intelligent layer is enabled to test the free capacitance, the resonant frequency, and the pasting effect of the piezoelectric transducer, comprehensively determine a state of the piezoelectric transducer, and ensure the accuracy of diagnosis on the performance of the piezoelectric transducer.

In this embodiment, the capacitance testing unit includes a step signal generator V1, a resistor R2, and a comparator U2. After being connected in series to the resistor R2, the step signal generator V1 is connected to two terminals of the piezoelectric transducer. In addition, a first reference voltage REF1 and a voltage at the two terminals of the piezoelectric transducer serve as inputs of the comparator U2. An output of the comparator is connected to an MCU. When the free capacitance value of the piezoelectric transducer is tested, input impedance of the region 3 is open-circuited relative to impedance of the equivalent circuit of the piezoelectric transducer. Therefore, the equivalent circuit of the capacitance testing unit is shown in FIG. 8.

Figure 9:
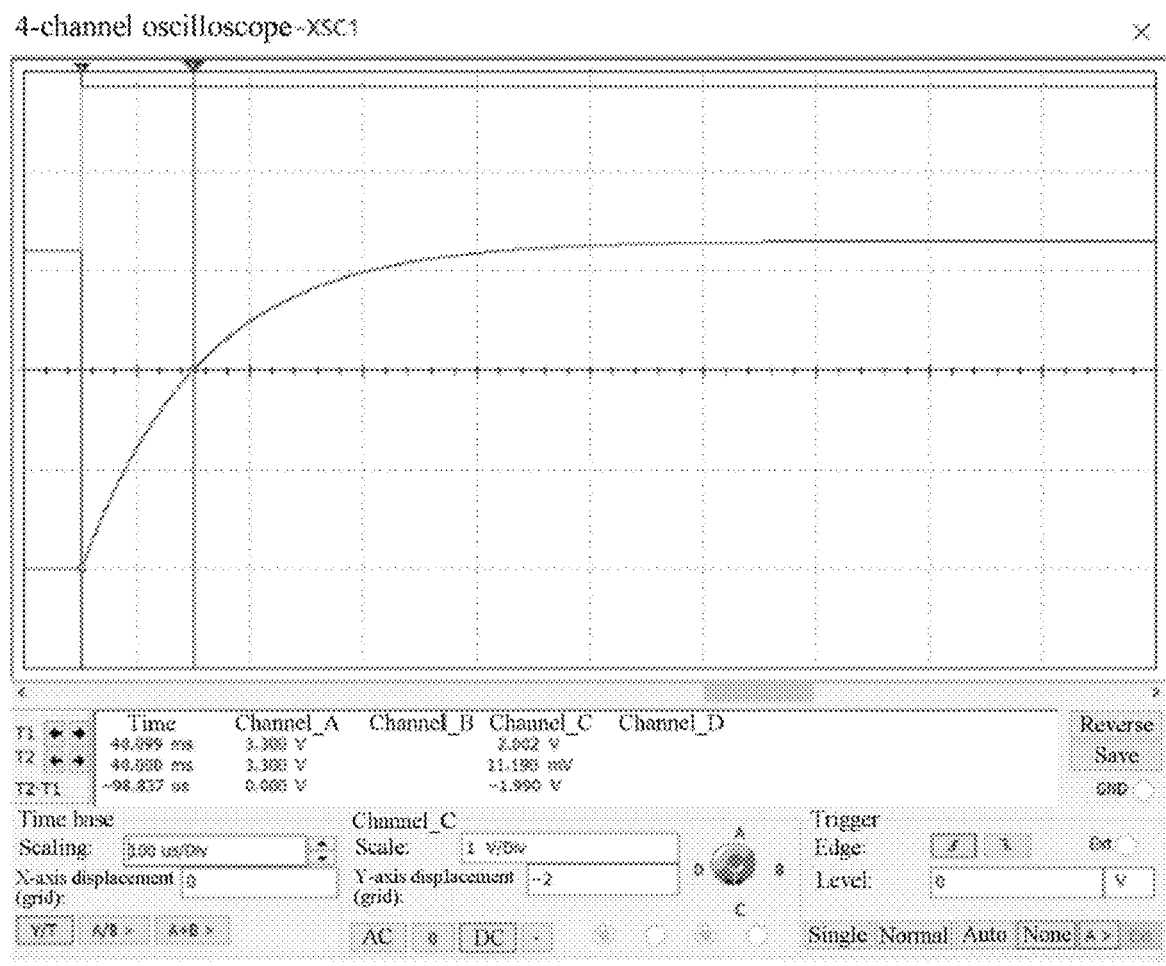
FIG. 9 is a diagram of a charging time simulation result according to Embodiment 1 of the present invention.
Figure 10:
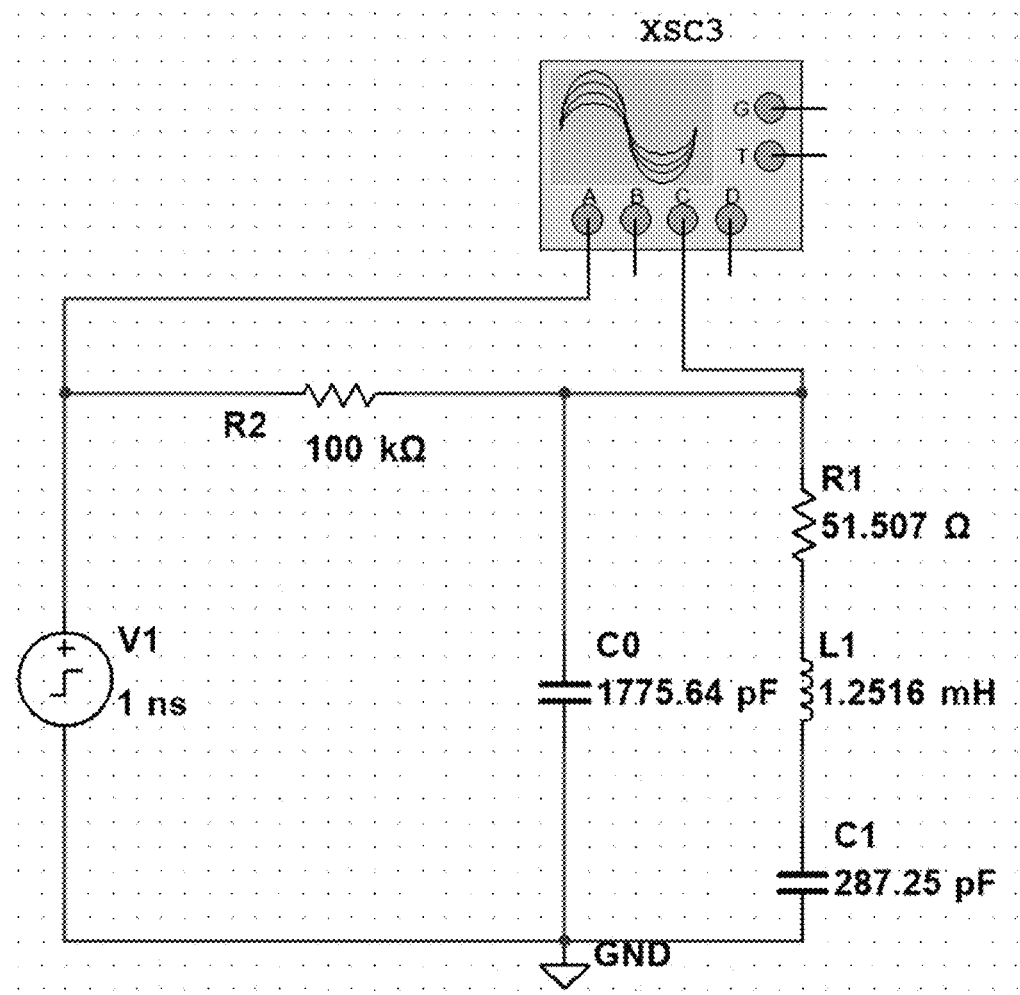
FIG. 10 is a schematic diagram of an equivalent circuit of a capacitance testing unit according to Embodiment 1 of the present invention after a capacitance value is changed.
Figure 11:
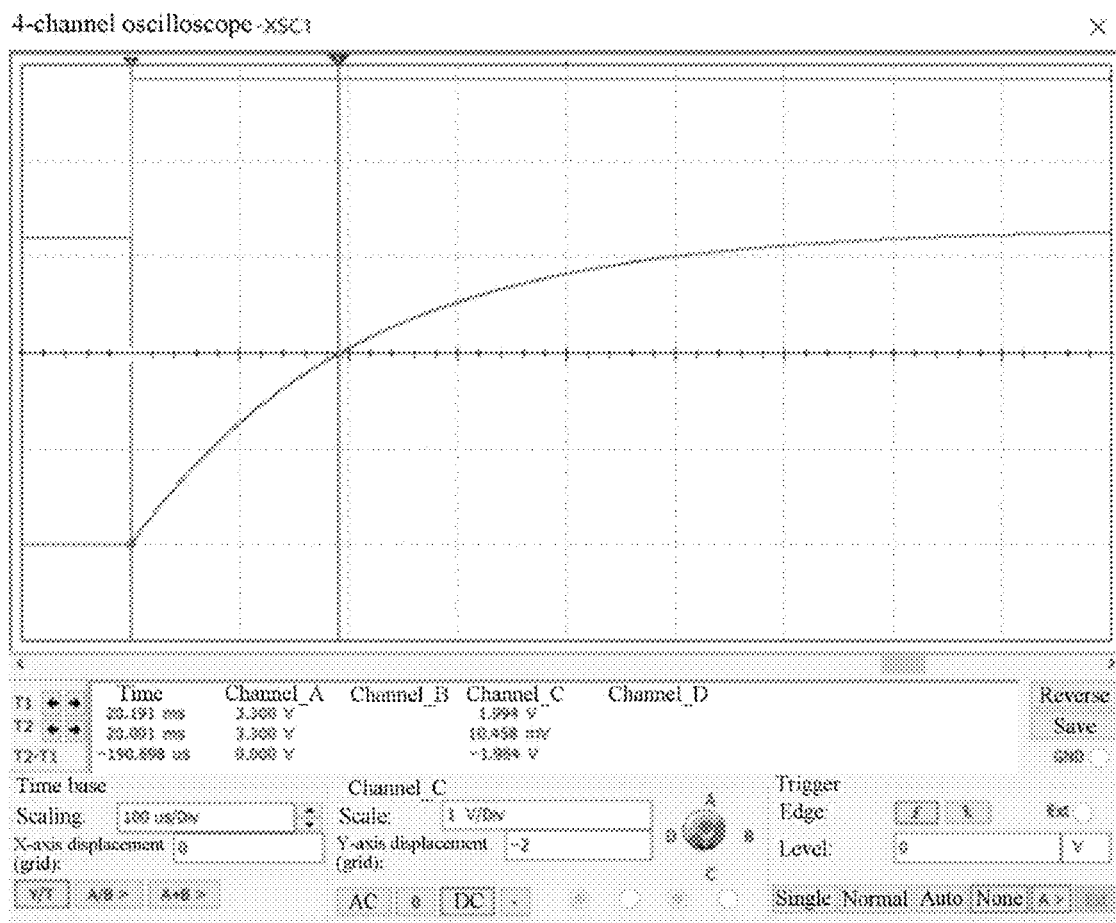
FIG. 11 is a diagram of a charging time simulation result according to Embodiment 1 of the present invention after a capacitance value is changed.

A step signal of a given amplitude U is output by controlling V1. Because resistance of R2 is large, the voltage at the two terminals of the piezoelectric transducer slowly rises. After a period of time, the voltage reaches a maximum value, as shown in FIG. 9. To verify effects at different capacitance values, a value of C0 is increased by 1 nF, as shown in FIG. 10, and a simulation result is shown in FIG. 11.

Figure 8:
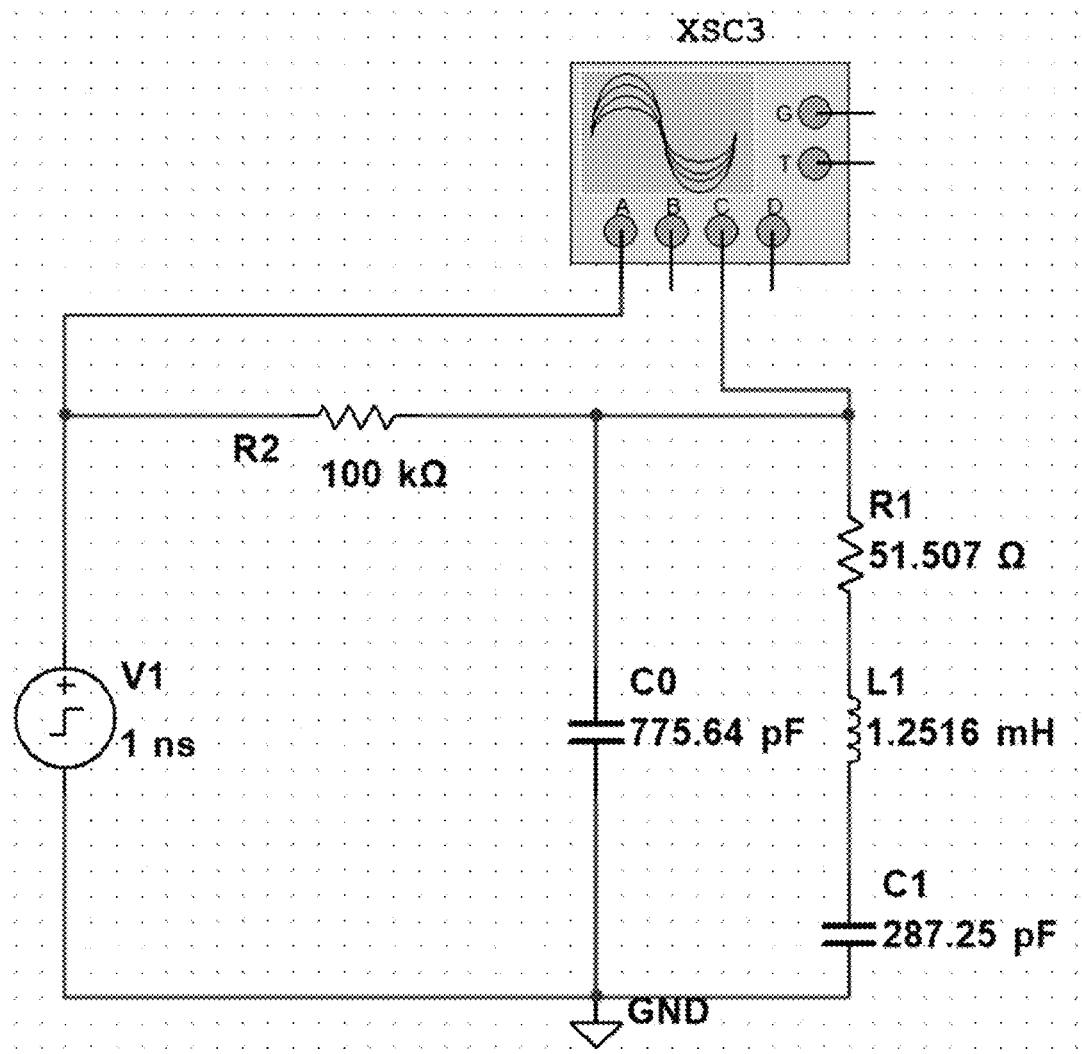
FIG. 8 is a schematic diagram of an equivalent circuit of a capacitance testing unit according to Embodiment 1 of the present invention.

In FIG. 7 and FIG. 8, V1 generates a 3.3 V step signal. When the step signal is applied to the two terminals of the piezoelectric transducer through the resistor R2, a voltage v at the two terminals of the piezoelectric transducer gradually increases with a time t, that is, a curve that increases slowly in FIG. 9. A formula of the curve is as follows:

$$v = U \times \left[1 - e^{\frac{-t}{R2*(C0+C1)}}\right]$$

The first reference voltage REF1 is set (for example, to 2 V). Before the voltage at the two terminals of the piezoelectric transducer increases to exceed 2 V, an output of U2 is a high level. When the voltage value exceeds 2 V, the output of the comparator is a low level. For example, 98.8 µs after a voltage is applied, the voltage at the two terminals of the piezoelectric transducer exceeds 2 V. In this case, the output of the comparator changes from high to low. Therefore, this transition moment is determined. For the microcontroller of the intelligent layer, a time from generation of the step signal to the output change of the comparator can be obtained (that is, 98.8 µs), and the first reference voltage 2 V is also known. The parameters are substituted into the formula (R2 is a fixed value 100 kΩ, U is an amplitude 3.3 V of the step signal, t is the obtained transition moment 98.8 µs, and v represents a voltage value of the piezoelectric transducer at the transition moment of the comparator and is the same as the first reference voltage REF1, which is 2 V). In this way, the free capacitance value (C0+C1) can be obtained, to determine whether the free capacitance value of the piezoelectric transducer is normal. In a normal case, a range of the free capacitance value of the piezoelectric transducer is ±20% of a nominal value.

In this embodiment, the frequency testing unit includes a sinusoidal signal generator V2, a resistor R3, an operational amplifier U3, and a comparator U1. After being connected in series to the resistor R3, the sinusoidal signal generator V2 is connected to the two terminals of the piezoelectric transducer. The operational amplifier U3 is connected in parallel to two terminals of the second resistor R3. An output of the operational amplifier U3 and a second reference voltage REF2 are inputs of the comparator U1. An output of the comparator U1 is connected to the MCU.

Figure 12:
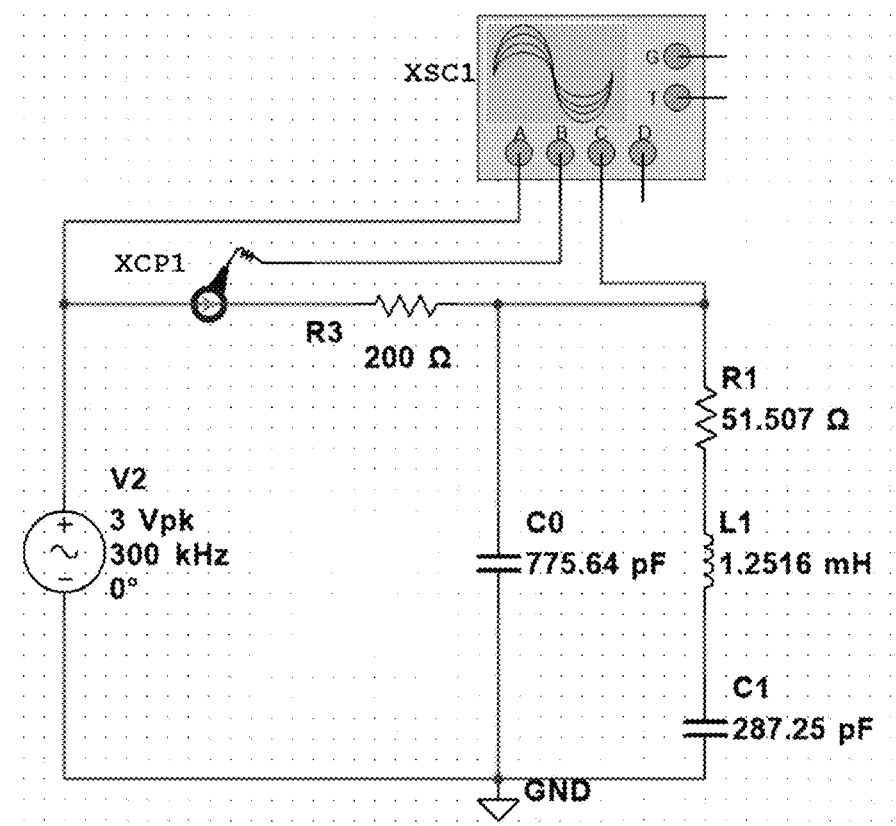
FIG. 12 is a schematic diagram of an equivalent circuit of a frequency testing unit according to Embodiment 1 of the present invention.
Figure 13A:
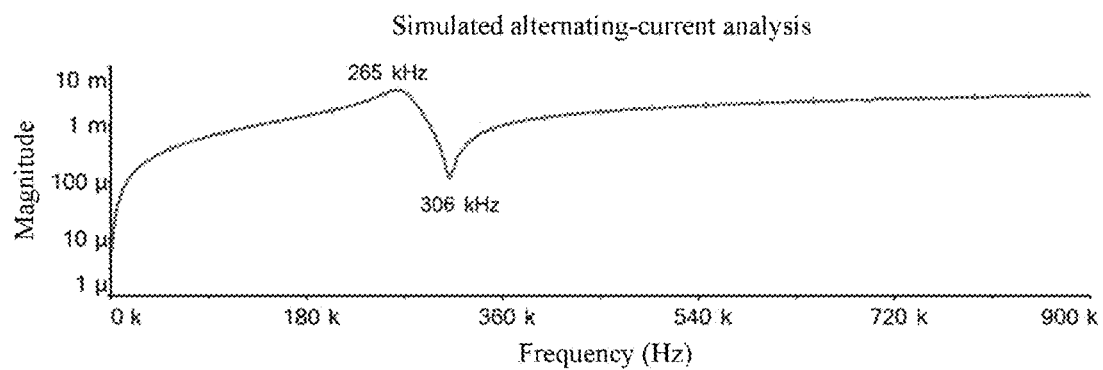
FIG. 13(a) and FIG. 13(b) are diagrams of amplitude-frequency and phase-frequency curves of an R3 current and a V2 frequency according to Embodiment 1 of the present invention.
Figure 13B:
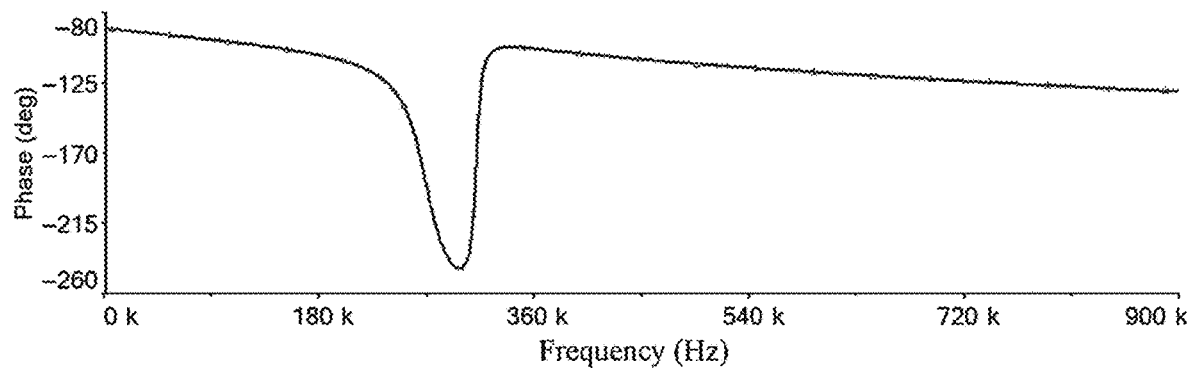

When the resonant frequency and the anti-resonant frequency of the piezoelectric transducer are tested, input impedance of the region 2 is open-circuited relative to impedance of the equivalent circuit of the piezoelectric transducer. Therefore, the equivalent circuit of the frequency testing unit is shown in FIG. 12. The sinusoidal signal generator V2 provides a sine wave of a fixed amplitude. When V2 is at different input frequencies, a value of a current at the two terminals of the resistor R3 is tested by using alternating-current simulation, and amplitude-frequency and phase-frequency curves of the current are shown in FIG. 13(a) and FIG. 13(b). It can be seen that the current of R3 has a maximum amplitude at a resonant frequency point and a minimum amplitude at an anti-resonant frequency point, which corresponds to an equivalent impedance curve of the piezoelectric transducer tested by an instrument.

Figure 14:
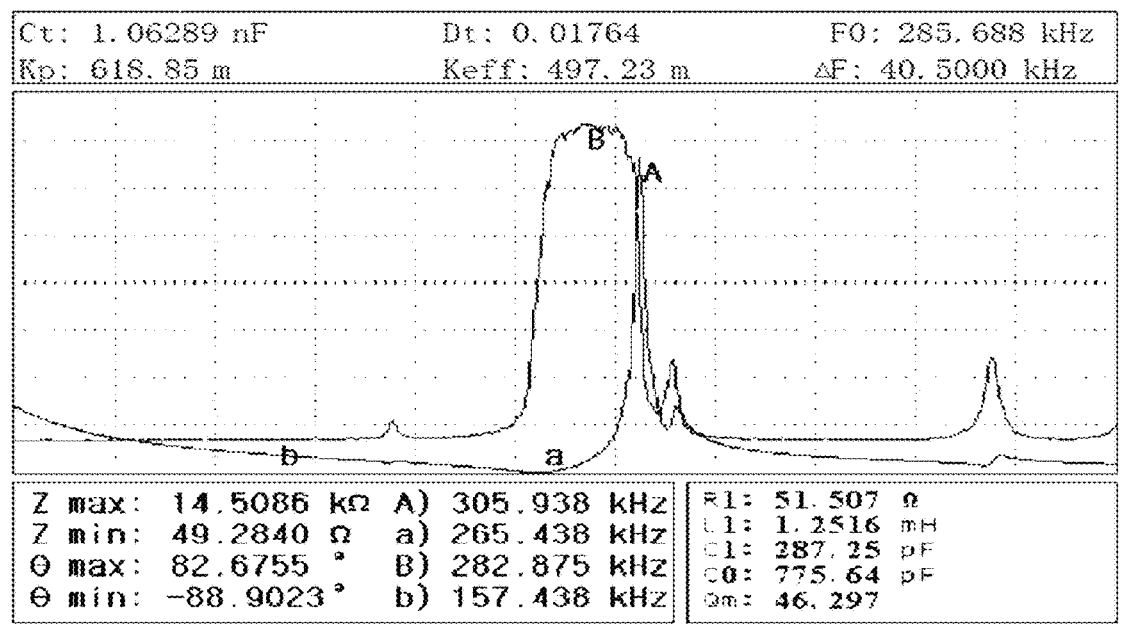
FIG. 14 is a trend chart of a resonant frequency and an anti-resonant frequency of a piezoelectric transducer according to Embodiment 1 of the present invention.

Therefore, to test the resonant frequency and the anti-resonant frequency of the piezoelectric transducer, the sinusoidal signal generator V2 (such as a DDS chip) is driven to output sinusoidal signals of different frequencies and a fixed amplitude, to charge the to-be-tested piezoelectric transducer. A change of the current at the two terminals of the resistor R3 is tested through the operational amplifier U3. In addition, a changing voltage is output. When the current at the two terminals of R3 is at the resonant frequency, an output current is the maximum, that is, impedance is the minimum, and when the current at the two terminals of R3 is at the anti-resonant frequency, an output current is the minimum, that is, impedance is the maximum, which correspond to a trend of the current curve and a trend of an impedance curve Z of the piezoelectric transducer tested by an impedance tester, as shown in FIG. 14.

The changing voltage is compared with the second reference voltage REF2 by using the comparator U1. When the second reference voltage REF2 is set to a value slightly less than a corresponding maximum current at the resonant frequency, as the frequency of the sinusoidal signal continuously increases, the output of the comparator changes from a high level to a low level and then to the high level again. A frequency range of the low level certainly includes the resonant frequency.

When the second reference voltage REF2 is set to a value slightly higher than a corresponding minimum current at the anti-resonant frequency, as the frequency of the sinusoidal signal continuously increases, the output of the comparator changes from a low level to a high level and then to the low level again. A frequency range of the high level certainly includes the anti-resonant frequency.

If REF2 is set appropriately, for example, to 1 mA in this embodiment, as the frequency of the sine wave increases, the output of the comparator changes from a high level to a low level, then from the low level to the high level (passes the resonant frequency during a low-level period), then changes from the high level to the low level (passes the anti-resonant frequency during a high-level period) again, and finally becomes the high level again.

Therefore, the resonant frequency and anti-resonant frequency of the piezoelectric transducer can be determined according to an emergence pattern of the high level and the low level and a frequency range of the corresponding sinusoidal signal in a comparison result. If the piezoelectric transducer is damaged, the output of the comparator does not show a changing pattern of the high and low levels.

In this embodiment, in addition to a free capacitance value detection result and a resonant frequency detection result, the piezoelectric transducer self-diagnosis result further includes a pasting effect detection result. The pasting effect detection needs to be implemented with the host. Specifically, any piezoelectric transducer is used to excite an ultrasonic signal, acquire a response signal from another piezoelectric transducer, and convert the response signal into a digital signal. The farther the distance between a piezoelectric transducer exciting ultrasound and a piezoelectric transducer receiving the ultrasound, the smaller the amplitude of a response signal, which presents a negative correlation. Therefore, amplitudes of a plurality of receiving piezoelectric transducers at different distances are compared, to determine whether there is an abnormal piezoelectric transducer. If both the free capacitance value and the resonant frequency of the piezoelectric transducer fall within specified ranges of the piezoelectric transducer, it indicates that there is something wrong with the pasting of the piezoelectric transducer, an ultrasonic signal is excited by replacing the piezoelectric transducer with a different piezoelectric transducer, and pasting effects of all piezoelectric transducers are determined by combining results of a plurality of tests.

A conventional analog, ultrasonic guided wave system transmits an analog signal. The analog signal is likely to be drowned in the noise. Therefore, a determination result is inaccurate. The improved intelligent layer of this embodiment converts an analog signal into a digital signal, to avoid signal amplitude attenuation, so that even if there is strong crosstalk and noise of a large amplitude, the determination of the pasting effect is not affected. In addition, the intelligent layer does not need to be connected to the system host, is only connected to the computer through the USB interface, is controlled by the microcontroller on the intelligent layer to emit an excitation. Although an amplitude of the excitation is lower than that of an excitation when the intelligent layer connected to the host, theoretically, the pasting effect can also be directly detected, and the performance of the piezoelectric transducer can be tested, leading to easy operations, strong implementability, and convenient conditioning. However, a conventional guided wave detection system can only determine the performance and the pasting quality of the piezoelectric transducer by powering the host to obtain waveforms. However, due to condition limitations at a project site, it is difficult to provide a power supply for the host at any time.

When the conventional guided wave detection system detects the performance and the pasting quality of the piezoelectric transducer, the host is required to excite an ultrasonic signal and perform determination according to an amplitude of an acquired ultrasonic response signal. In addition, the identification performed on damage on the structure also heavily relies on quality of the response signal, including an amplitude, a signal-to-noise ratio, and the like. Therefore, the conventional guided wave detection system has high requirements on the ultrasonic response signal. However, the length of the cable between the host and the intelligent layer is tens of meters. Factors, such as strong crosstalk from external interference and excitations, and attenuation caused by resistance of the cable, all seriously affect the amplitude and signal-to-noise ratio of the ultrasonic signal. Therefore, when the response signal propagates in the cable, signal attenuation may be caused, wide band ambient noise and a crosstalk signal of a same frequency and a large amplitude are also superimposed, and it is very likely that the response signal is completely drowned out by other signals. Therefore, in an application scenario in which a connection cable between the host and the intelligent layer is long, even if the host performs processing, such as filtering, on the signal, it is still difficult to effectively determine a waveform of the response signal, which may result in improper determination of the pasting quality.

For the digital intelligent layer of this embodiment, the ultrasonic response signal is acquired and converted into a digital signal at the intelligent layer, and is transmitted to a host computer using differential communication, which increases the anti-interference capability of the signal, avoids attenuation of the signal during transmission, avoids a strong crosstalk signal brought by the long cable, so that the pasting quality of the piezoelectric transducer can be determined more effectively, and the pasting quality of the piezoelectric transducer and damage on the structure can also be determined more accurately, thereby resolving the foregoing problems that exist in the transmission of the analog signal.

In this embodiment, an active signal conditioning unit is further included. As shown in FIG. 7, the piezoelectric transducer is connected to the operational amplifier U5. Conditioning functions, such as amplification and filtering, are implemented through the operational amplifier U5 on ultrasonic response signals of the exciting piezoelectric transducer and the receiving piezoelectric transducer. The free capacitance value test, the resonant frequency test, and the active signal conditioning are implemented using a same circuit interface, and functions are automatically switched according to function needs, so that the size of the circuit is reduced. When the intelligent layer works in the active damage scanning mode and is used, signal conditioning is performed by using U5, and neither V1 nor V2 outputs a signal, to reduce impact of another circuit on the response signal.

In this embodiment, in the active damage scanning mode, to obtain a more accurate damage identification result, it is necessary to clarify a transmission time of the ultrasonic signal in the structure, that is, a flight time of the ultrasonic signal. An arrival time of the ultrasonic signal may be obtained from a start time of a response signal from the receiving piezoelectric transducer, and a start time of the ultrasonic signal is obtained from an arrival time of an excitation.

Figure 15:
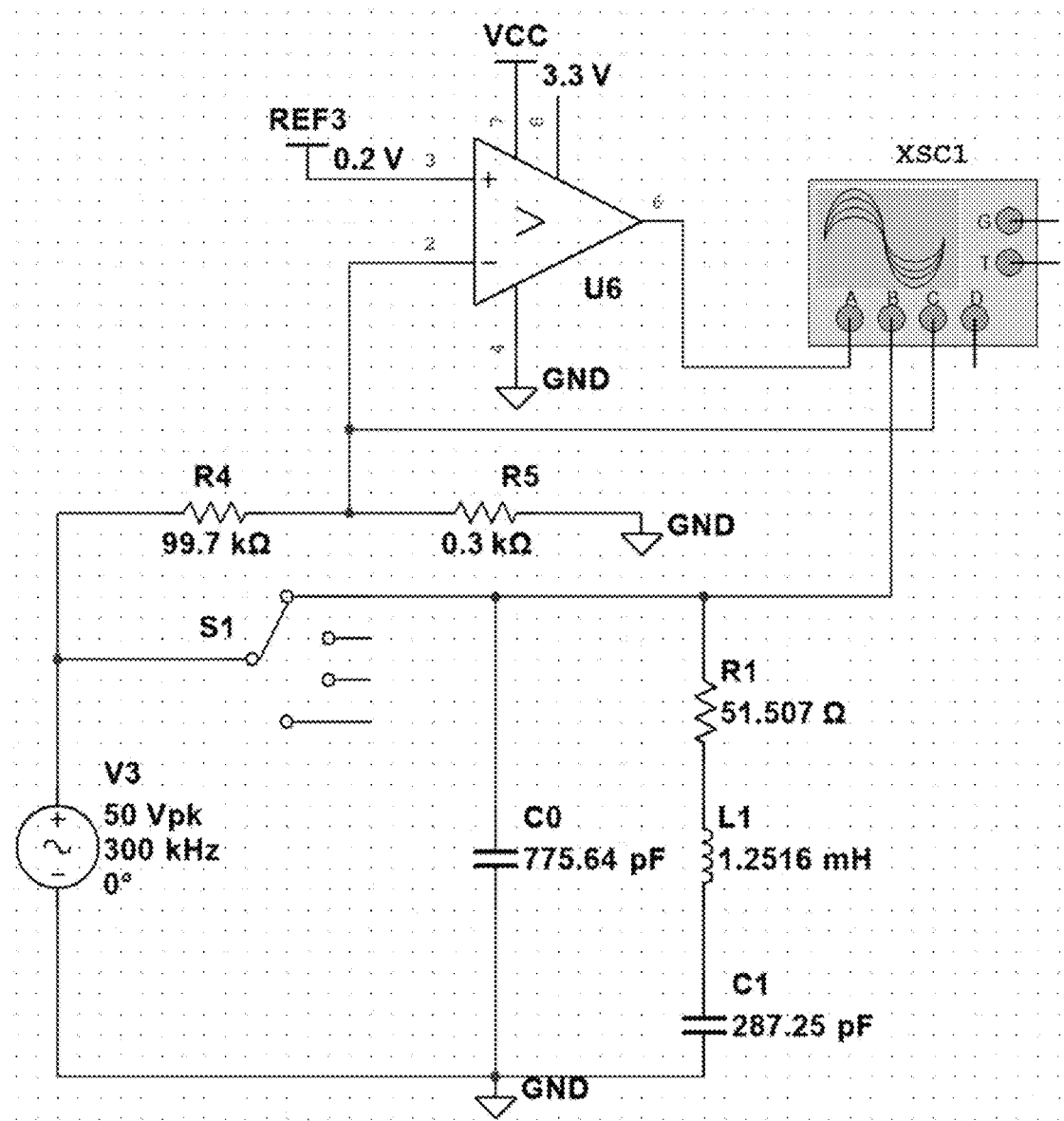
FIG. 15 is a schematic diagram of an equivalent circuit of an excitation arrival time detection unit according to Embodiment 1 of the present invention.
Figure 16:
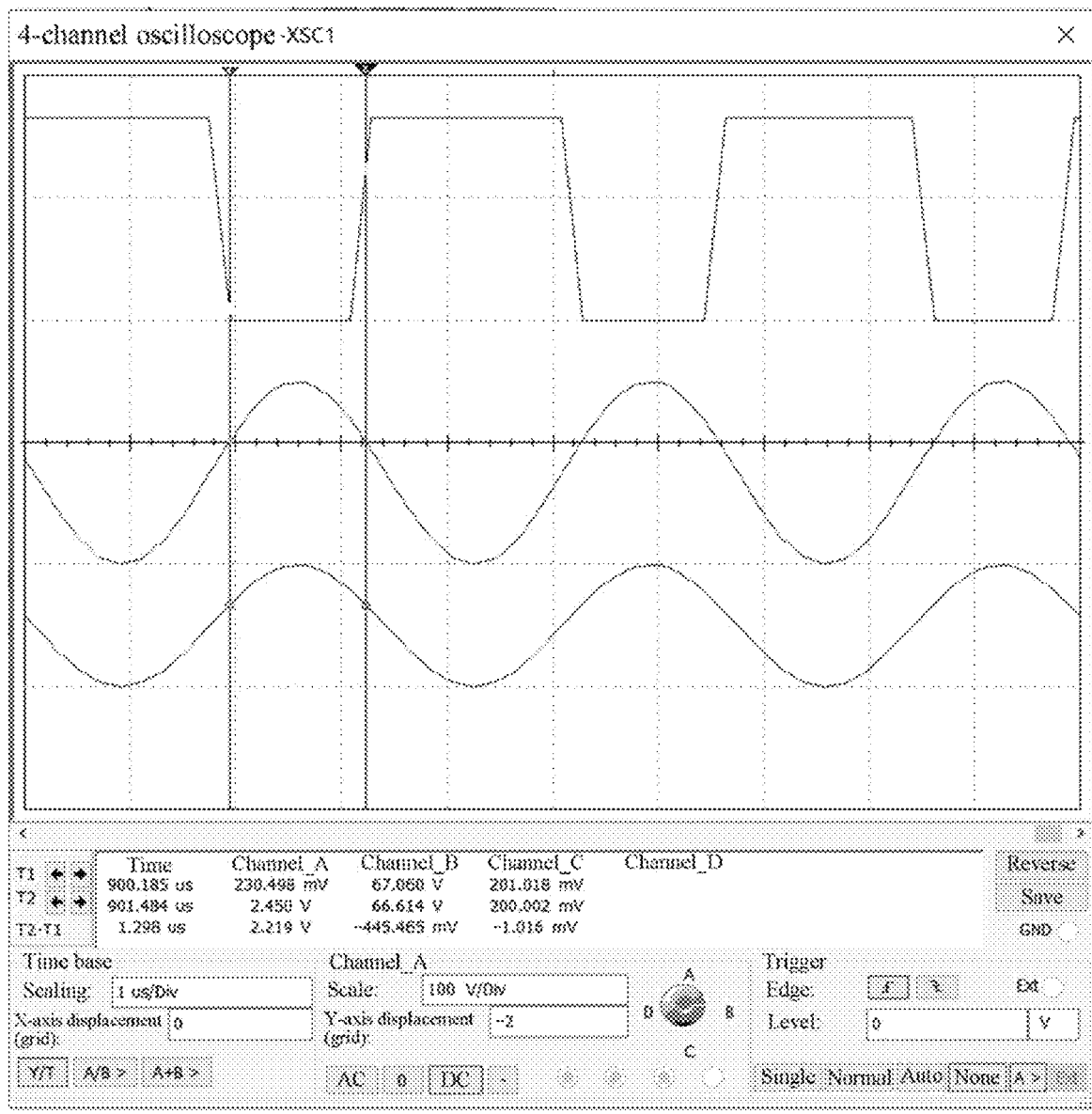
FIG. 16 is a diagram of a simulation result of an excitation arrival time detection unit according to Embodiment 1 of the present invention.

FIG. 15 is a schematic diagram of an equivalent circuit of an excitation arrival time detection unit. An exciting piezoelectric transducer is connected through a 1-out-of-N excitation selector. V3 emits a sinusoidal excitation, and voltage division is performed the sinusoidal excitation through resistors R4 and R5, and a voltage obtained after the voltage division and a third reference voltage REF3 are input into a comparator U6. A simulation result is shown in FIG. 16. A waveform after the voltage division is at the same frequency as the excitation. When a voltage amplitude after the voltage division is greater than REF3, the comparator U6 outputs a low level; otherwise, outputs a high level. An arrival moment of the excitation is determined according to times during which the comparator outputs high and low levels and a frequency of the sinusoidal excitation.

Assuming that an excitation V3 is a 300 kHz sine wave with an amplitude of 0 to 100 V, has only one cycle, and starts from a moment 0, a voltage formula of the excitation V3 is as follows:

$$U=50\sin(300000t)+50$$

Figure 17:
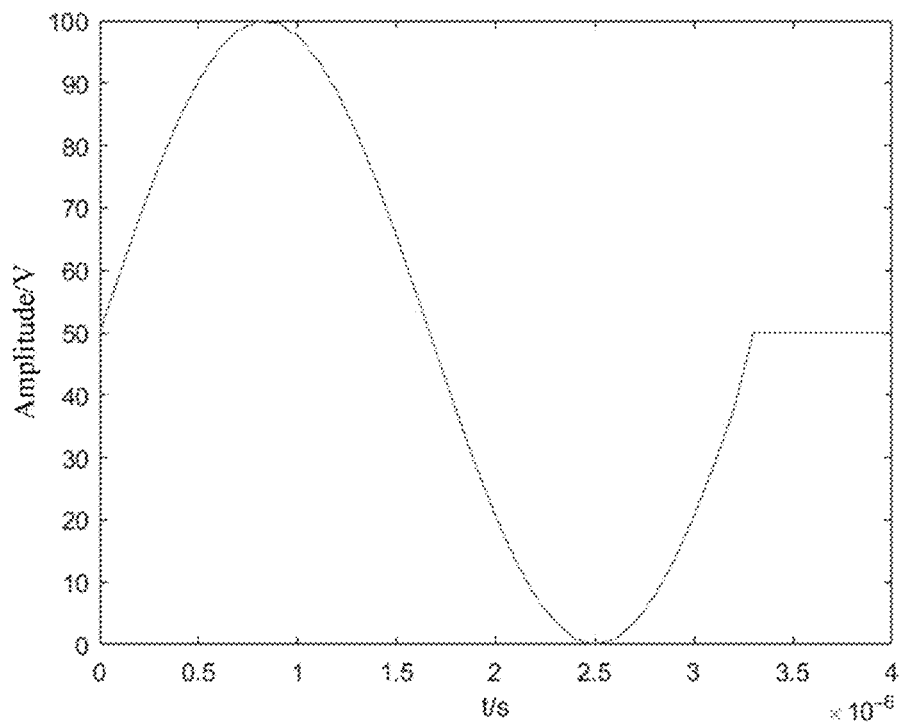
FIG. 17 is a waveform diagram of an excitation according to Embodiment 1 of the present invention.
Figure 18:
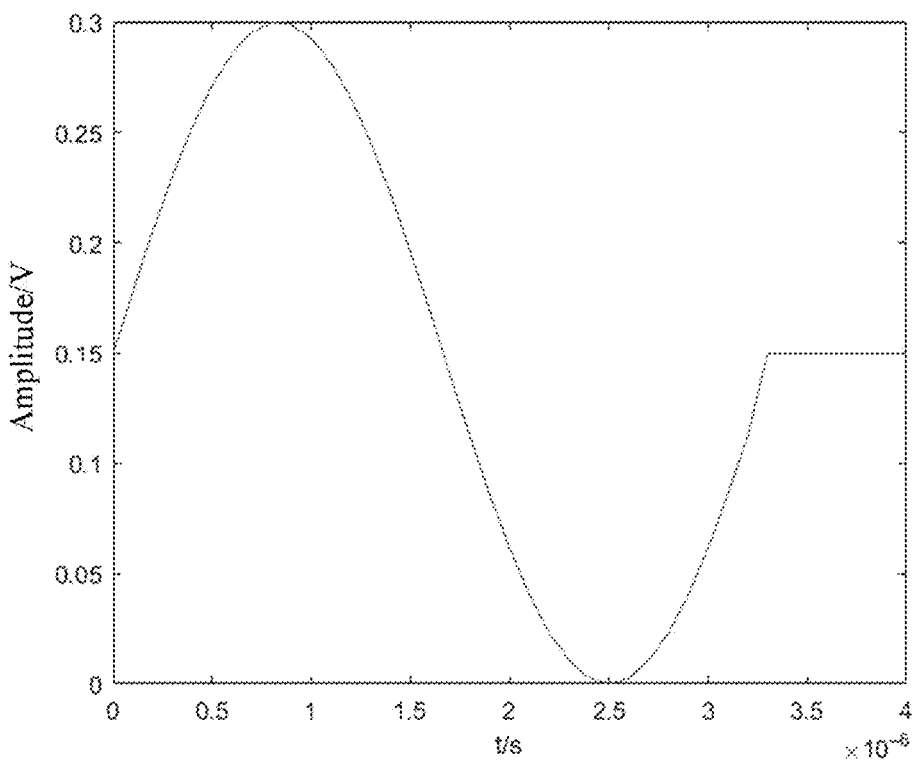
FIG. 18 is a waveform diagram of an attenuated excitation according to Embodiment 1 of the present invention.
Figure 19:
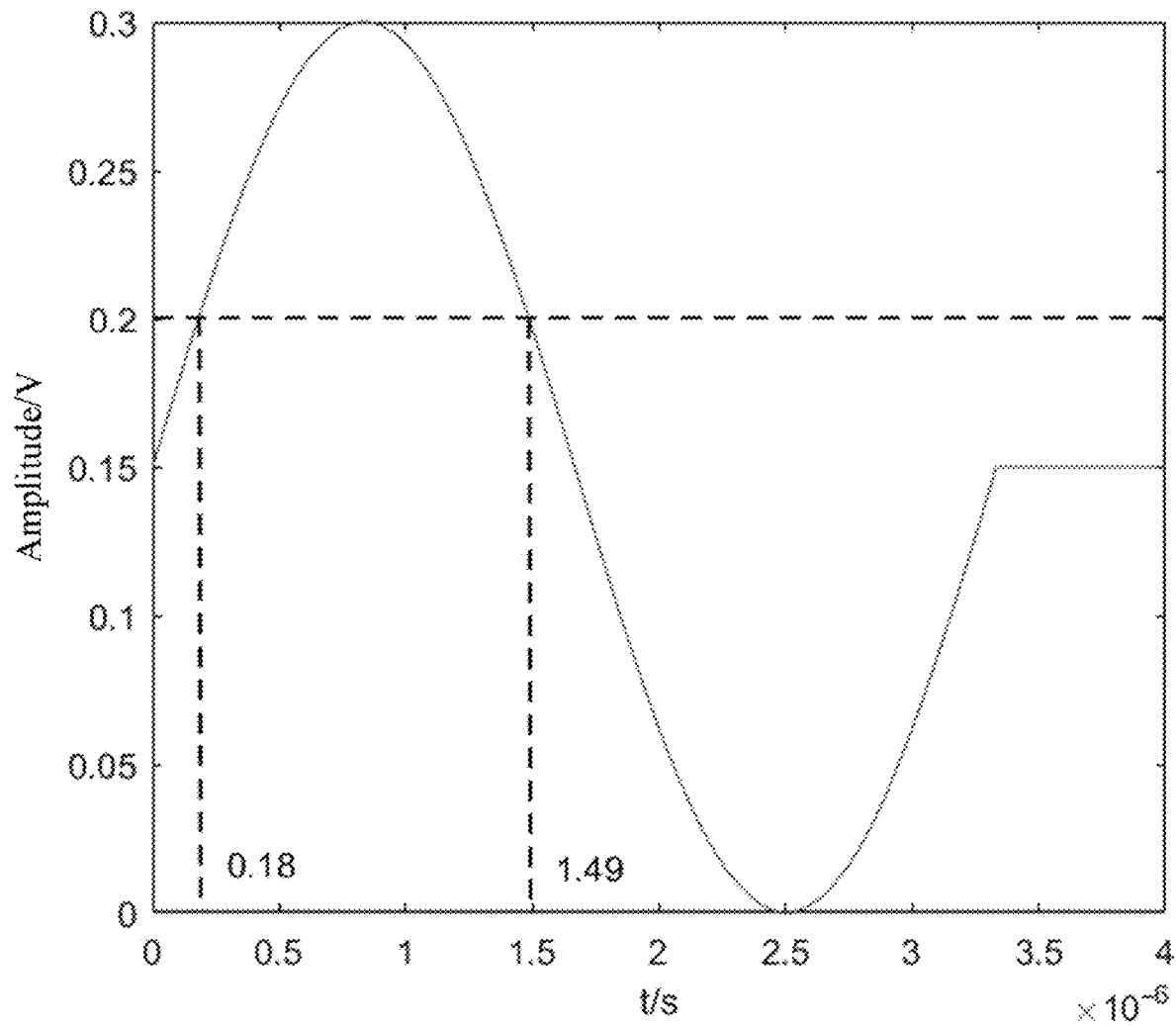
FIG. 19 is a schematic diagram of a transition moment output by a comparator U6 according to Embodiment 1 of the present invention.

A waveform of the excitation is shown in FIG. 17. A waveform of an attenuated excitation obtained after performing voltage division by using a resistor of 99.7 kΩ and a resistor of 0.3 kΩ is shown in FIG. 18. REF3 input at a positive pole of the comparator U6 is 0.2 V, and is substituted into the left side of the foregoing equation, and it can be obtained that t is 0.18 μs and 1.49 μs respectively, as shown in FIG. 19. Therefore, between 0.18 μs and 1.49 μs, the comparator U6 outputs a low level, and outputs a high level during the remaining time. This means that for an excitation fixed at 300 kHz, the microcontroller captures a transition edge of the output of the comparator from a high level to a low level, and subtracts 0.18 μs from this moment, which leads to a start moment of the excitation. For an excitation of another frequency, a time difference between an excitation start moment and an output moment of the comparator may be calculated according to the third reference voltage REF3 and an excitation frequency, and further, the excitation start moment may be calculated according to the output transition of the comparator. In an actual case, there is an ns-level latency between the input and the output of the comparator. A calculation error may be reduced by adding a latency parameter of the comparator into the calculation.

Although an action time of the comparator may have an error, with the improvement of the semiconductor technologies, the magnitude of the error ranges from a few ns to more than ten ns. However, even if the guided wave host is used to determine the flight time, such errors still exist. In addition, in an ideal case, a transmission speed of an electrical signal in a cable is about $2.4*10^8$ m/s. A 10 m cable forms a transmission distance of 20 m, resulting in a signal transmission latency of 83 ns. Moreover, such an error increases as the length of the cable increases, and the latency is much greater than a measurement error of the arrival time of the excitation detected on the intelligent layer. Therefore, it is appropriate to determine the arrival time of the excitation on the intelligent layer.

In this embodiment, based on the equivalent circuit of the piezoelectric transducer, RC charging, voltage and current detection, and the like are designed, to enable the intelligent layer to perform self-diagnosis tests on parameters, such as the free capacitance value and the resonant frequency, of the piezoelectric transducer. In addition, during all the stages such as the capacity test, the frequency test, and the excitation arrival time detection, determination is performed by using the level output by the comparator rather than using a digital-to-analog conversion chip with a high sampling rate (to implement μs-level detection, at least a chip of 10 MSPS is needed to better reproduce a to-be-sampled signal; if a microcontroller is used as the main control chip, it is difficult to achieve sampling at such a high rate without adding a cache chip or the like, and if an FPGA is used as the main control chip, the circuit is complex), leading to a simple circuit, low power consumption, and low costs, which is conducive to reducing the size of the intelligent layer.

In this embodiment, if a digital signal is used for transmission, a quantity of and definitions of cores of the cable do not change with the change a quantity of piezoelectric transducers. A quantity of cores of a cable of the conventional intelligent layer may change due to a quantity of piezoelectric transducers of the intelligent layer. Definitions of the cores may differ due to layout positions of the piezoelectric transducers. Therefore, the improved intelligent layer of this embodiment reduces the use of customized cables and lowers system costs.

The digital, self-diagnosis, sensing intelligent layer integrating active and passive monitoring provided in this embodiment may implement functions such as excitation time arrival testing, capacity testing, frequency testing, conditioning and acquisition, and power switching, and may switch between three working modes: piezoelectric transducer state testing, active damage scanning, and passive impact monitoring. During piezoelectric transducer state testing, the intelligent layer may implement self-diagnosis on a performance state of the piezoelectric transducer according to feature parameters, such as the free capacitance value and the resonant frequency, of the piezoelectric transducer. When working in the active scanning mode, the intelligent layer closes switch channels of the exciting piezoelectric transducer and the receiving piezoelectric transducer according to the requirements of the host, converts an analog response signal into a digital signal, and transmits the digital signal to the host. When working in the passive scanning mode, the intelligent layer monitors response signals from all piezoelectric transducers, converts a triggered signal into a digital signal, and transmits the digital signal to the host. However, the conventional intelligent layer only leads out connection lines of all piezoelectric transducers and does not have the foregoing functions.

Embodiment 2

This embodiment provides a working method of the foregoing digital, self-diagnosis, sensing intelligent layer integrating active and passive monitoring, including:
connecting N piezoelectric transducers to a 1-out-of-N excitation selector, a 1-out-of-N acquisition selector, and N switches, to switch to a corresponding channel in different modes;
in a piezoelectric transducer self-diagnosis mode, opening all the 1-out-of-N excitation selector and the N switches, and closing, by the 1-out-of-N acquisition selector, a corresponding switch channel according to a serial number of a to-be-tested piezoelectric transducer, to perform a capacitance test, a frequency test, and pasting effect detection on the to-be-tested piezoelectric transducer, where
the capacitance test includes: charging the to-be-tested piezoelectric transducer by generating a step signal of a given amplitude, determining a transition moment by comparing a voltage at two terminals of the to-be-tested piezoelectric transducer with a first reference voltage, to determine a capacitor charging time, and then, obtaining a free capacitance value of the to-be-tested piezoelectric transducer, to determine whether the free capacitance value is normal; and
the frequency test includes: charging the to-be-tested piezoelectric transducer by generating sinusoidal signals of different frequencies and a fixed amplitude, determining a changing voltage according to a current of the to-be-tested piezoelectric transducer, comparing the changing voltage with a second reference voltage, and detecting a resonant frequency according to a frequency of a sinusoidal signal corresponding to a transition moment for high and low levels in a comparison result; and
the pasting effect detection includes exciting, by any piezoelectric transducer, an ultrasonic signal, acquiring an analog response signal from another receiving piezoelectric transducer, converting the analog response signal into a digital response signal, and comparing amplitudes of digital response signals from receiving piezoelectric transducers at different distances, to determine whether there is an abnormal piezoelectric transducer, where if both a free capacitance value and a resonant frequency of the abnormal piezoelectric transducer fall within specified ranges, a pasting effect of the piezoelectric transducer is incorrect;
in the active mode, opening all the N switches, closing corresponding switch channels in the 1-out-of-N excitation selector and the 1-out-of-N acquisition selector according to a serial number of a piezoelectric transducer emitting an excitation and receiving a response, to obtain an analog response signal from a corresponding piezoelectric transducer and convert the analog response signal into a digital response signal for transmission; and
in the passive mode, opening both the 1-out-of-N excitation selector and the 1-out-of-N acquisition selector, and closing all the N switches, to obtain an analog response signal received by the piezoelectric transducer after triggering of an impact event, and convert the analog response signal into a digital response signal for transmission.

In the present invention, the concept of the digital, self-diagnosis, sensing intelligent layer is provided for the first time, an ultrasonic response signal is converted into a digital quantity for transmission, to improve the anti-interference capability of signal transmission, and a piezoelectric transducer self-diagnosis function is also integrated. Related improvement solutions of the intelligent layer are all improvements based on the present invention.

In the present invention, a digital differential level signal is used for transmission, which is a way to improve the anti-interference capability during signal transmission. Alternatively, a current signal of 4 to 20 mA may be used for data transmission. However, because resistance of a long cable is large, the present invention does not adopt the manner of using an analog current of 4 to 20 mA for transmission, but such a manner may also be used as a solution to improve the anti-interference capability during signal transmission.

In the present invention, to reduce the volume, costs, and power consumption of the circuit, resistors, capacitors, and comparators are used to test the free capacitance value and the resonant frequency. This detection method is integrated into the intelligent layer for the first time, thereby forming an intelligent layer capable of performing self-diagnosis. It is principally feasible to detect the capacitance and the resonant frequency in another manner regardless of whether it is using an integrated chip or another constructed circuit.

In the present invention, to lower power consumption, reduce the volume of the circuit, and lower the circuit costs, comparators are used in the excitation arrival time detection unit, a capacitance detection unit, and a frequency detection unit to output high and low levels to determine a corresponding event. If the foregoing factors are not considered, an analog-to-digital conversion circuit can certainly be used to acquire a waveform of a signal and further determine an arrival time of an excitation.

In the present invention, the pasting effect detection on the piezoelectric transducer needs to be cooperated with use of a guided wave host because the host is required to provide a large-power, high-voltage signal to drive the piezoelectric transducer to obtain a response of a higher amplitude, and further accurately determine the pasting effect of the piezoelectric transducer. If a USB interface of a computer is used for power supply, a power amplification circuit may be added to achieve high-voltage driving, or the piezoelectric transducer may be driven by directly using a low-voltage signal, to obtain a weak response signal, both of which can implement determination of the pasting effect of the piezoelectric transducer. In the present invention, in consideration of the factors such as reducing a size of the intelligent layer and lowering costs, no piezoelectric transducer driver circuit powered through the USB interface is added in this solution.

The specific implementations of the present invention are described above with reference to the accompanying drawings, but are not intended to limit the protection scope of the present invention. A person skilled in the art should understand that various modifications or transformations may be made without creative efforts based on the technical solutions of the present invention, and such modifications or transformations shall fall within the protection scope of the present invention.

What is claimed is:

1. A digital, self-diagnosis, sensing intelligent layer integrating active and passive monitoring, comprising: a piezoelectric transducer self-diagnosis module, an active and passive monitoring module, and a main control module, wherein the piezoelectric transducer self-diagnosis module comprises:

a capacitance testing unit, configured to charge a to-be-tested piezoelectric transducer by generating a step signal of a given amplitude, determine a transition moment by comparing a voltage at two terminals of the to-be-tested piezoelectric transducer with a first reference voltage, to determine a capacitor charging time, and then, obtain a free capacitance value of the to-be-tested piezoelectric transducer, to determine whether the free capacitance value is normal; and a frequency testing unit, configured to charge the to-be-tested piezoelectric transducer by generating sinusoidal signals of different frequencies and a fixed amplitude, determine a changing voltage according to a current of the to-be-tested piezoelectric transducer, compare the changing voltage with a second reference voltage, and detect a resonant frequency according to a frequency of a sinusoidal signal corresponding to a transition moment for high and low levels in a comparison result;

the active and passive monitoring module is configured to obtain analog response signals from the piezoelectric transducer in an active mode and a passive mode, and convert the analog response signals into digital response signals for transmission; and the main control module is configured to transmit a piezoelectric transducer self-diagnosis result and the digital response signals to an external guided wave host; and the digital, self-diagnosis, sensing intelligent layer further comprises N piezoelectric transducers, and a 1-out-of-N excitation selector, a 1-out-of-N acquisition selector, and N switches that are connected to the piezoelectric transducers, to switch to a corresponding channel in different modes, wherein in a piezoelectric transducer self-diagnosis mode, the 1-out-of-N excitation selector and the N switches are all opened, and the 1-out-of-N acquisition selector closes a corresponding switch channel according to a serial number of the to-be-tested piezoelectric transducer, to perform a capacitance test and a frequency test on the to-be-tested piezoelectric transducer;

in the active mode, the N switches are all opened, a corresponding switch channel in the 1-out-of-N excitation selector is closed according to a serial number of an exciting piezoelectric transducer emitting an excitation, and a corresponding switch channel in the 1-out-of-N acquisition selector is closed according to a serial number of a receiving piezoelectric transducer receiving a response, to obtain the analog response signal of the piezoelectric transducer in the active mode and convert the analog response signal into the digital response signal; and in the passive mode, the 1-out-of-N excitation selector and the 1-out-of-N acquisition selector are both opened, and the N switches are all closed, to obtain the analog response signal of the piezoelectric transducer in the passive mode and convert the analog response signal into the digital response signal.

2. The digital, self-diagnosis, sensing intelligent layer integrating active and passive monitoring according to claim 1, wherein the digital, self-diagnosis, sensing intelligent

19 layer further comprises a USB interface connected to a computer and a host interface connected to the external guided wave host.

3. The digital, self-diagnosis, sensing intelligent layer integrating active and passive monitoring according to claim 1, wherein the digital, self-diagnosis, sensing intelligent layer has a power switching function and is configured to switch, when being powered by both the computer and the external guided wave host, to being powered by the external guided wave host.

4. The digital, self-diagnosis, sensing intelligent layer integrating active and passive monitoring according to claim 1, wherein the capacitance testing unit comprises a step signal generator, a first resistor, and a first comparator; after being connected in series to the first resistor, the step signal generator is connected to the two terminals of the piezoelectric transducer, and the first reference voltage and the voltage at the two terminals of the piezoelectric transducer serve as inputs of the first comparator;

the free capacitance value of the to-be-tested piezoelectric transducer is:

$$v = U \times \left[1 - e^{\frac{-t}{R2*(C0+C1)}}\right]$$

wherein v is the voltage at the two terminals of the to-be-tested piezoelectric transducer, U is the amplitude of the step signal, t is a time of applying the step signal, R2 is a known first resistance value, C0 is a static capacitance value of the piezoelectric transducer, C1 is a dynamic capacitance value of the piezoelectric transducer, and C0+C1 is the free capacitance value.

5. The digital, self-diagnosis, sensing intelligent layer integrating active and passive monitoring according to claim 1, wherein the frequency testing unit comprises a sinusoidal signal generator, a second resistor, an operational amplifier, and a second comparator; and after being connected in series to the second resistor, the sinusoidal signal generator is connected to the two terminals of the piezoelectric transducer, the operational amplifier is connected in parallel to two terminals of the second resistor, an output of the operational amplifier and the second reference voltage are inputs of the second comparator, a change of a current at the two terminals of the second resistor is tested through the operational amplifier, and the changing voltage is output.

6. The digital, self-diagnosis, sensing intelligent layer integrating active and passive monitoring according to claim 1, wherein the piezoelectric transducer self-diagnosis module further comprises a pasting effect detection unit, configured to excite, by any piezoelectric transducer, an ultrasonic signal, acquire an analog response signal from another receiving piezoelectric transducer, convert the analog response signal into a digital response signal, and compare amplitudes of digital response signals from receiving piezoelectric transducers at different distances, to determine whether there is an abnormal piezoelectric transducer, wherein if both a free capacitance value and a resonant frequency of the abnormal piezoelectric transducer fall within specified ranges, it indicates that a pasting effect of the piezoelectric transducer is incorrect.

7. The digital, self-diagnosis, sensing intelligent layer integrating active and passive monitoring according to claim 1, wherein in the active and passive monitoring module;

in the active mode, the exciting piezoelectric transducer emits an excitation obtains the analog response signal from the receiving piezoelectric transducer, and after

20 converting the analog response signal convert into a digital response signal, transmits the digital response signal, to perform active damage scanning; and in the passive mode, an analog response signal received by the piezoelectric transducer after triggering of an impact event is obtained, and the analog response signal is converted into a digital response signal for transmission, to perform passive impact monitoring.

8. The digital, self-diagnosis, sensing intelligent layer integrating active and passive monitoring according to claim 7, wherein the active and passive monitoring module further comprises an excitation arrival time detection unit, configured to determine an excitation arrival moment in the active mode, wherein specifically, a voltage of the emitted excitation is divided, the divided voltage is compared with a third reference voltage by using a comparator, and the excitation arrival moment is determined according to times of high and low levels obtained after the comparison and a frequency of the excitation.

9. A working method of a digital, self-diagnosis, sensing intelligent layer integrating active and passive monitoring, comprising:

connecting N piezoelectric transducers to a 1-out-of-N excitation selector, a 1-out-of-N acquisition selector, and N switches, to switch to a corresponding channel in different modes;

in a piezoelectric transducer self-diagnosis mode, opening all the 1-out-of-N excitation selector and the N switches, and closing, by the 1-out-of-N acquisition selector, a corresponding switch channel according to a serial number of a to-be-tested piezoelectric transducer, to perform a capacitance test, a frequency test, and pasting effect detection on the to-be-tested piezoelectric transducer, wherein the capacitance test comprises: charging the to-be-tested piezoelectric transducer by generating a step signal of a given amplitude, determining a transition moment by comparing a voltage at two terminals of the to-be-tested piezoelectric transducer with a first reference voltage, to determine a capacitor charging time, and then, obtaining a free capacitance value of the to-be-tested piezoelectric transducer, to determine whether the free capacitance value is normal; and the frequency test comprises: charging the to-be-tested piezoelectric transducer by generating sinusoidal signals of different frequencies and a fixed amplitude, determining a changing voltage according to a current of the to-be-tested piezoelectric transducer, comparing the changing voltage with a second reference voltage, and detecting a resonant frequency according to a frequency of a sinusoidal signal corresponding to a transition moment for high and low levels in a comparison result; and the pasting effect detection comprises exciting, by any piezoelectric transducer, an ultrasonic signal, acquiring an analog response signal from another receiving piezoelectric transducer, converting the analog response signal into a digital response signal, and comparing amplitudes of digital response signals from receiving piezoelectric transducers at different distances, to determine whether there is an abnormal piezoelectric transducer, wherein if both a free capacitance value and a resonant frequency of the abnormal piezoelectric transducer fall within specified ranges, a pasting effect of the piezoelectric transducer is incorrect;

in the active mode, opening all the N switches, closing corresponding switch channels in the 1-out-of-N excitation selector and the 1-out-of-N acquisition selector according to a serial number of a piezoelectric transducer emitting an excitation and receiving a response, to obtain an analog response signal from a corresponding piezoelectric transducer and convert the analog response signal into a digital response signal for transmission; and in the passive mode, opening both the 1-out-of-N excitation selector and the 1-out-of-N acquisition selector, and closing all the N switches, to obtain an analog response signal received by the piezoelectric transducer after triggering of an impact event, and convert the analog response signal into a digital response signal for transmission.

\* \* \* \* \*